United States Patent
Standop et al.

(10) Patent No.: US 10,724,998 B2
(45) Date of Patent: Jul. 28, 2020

(54) METHOD AND SYSTEM FOR INSPECTING A RAIL PROFILE USING PHASED ARRAY TECHNOLOGY

(71) Applicant: General Electric Company, Schenectady, NY (US)

(72) Inventors: Sebastian Standop, Kerpen (DE); Prashanth Kumar Chinta, Huerth (DE); Guenter Fuchs, Ruppichteroth (DE); Stephan Falter, Simmerath (DE)

(73) Assignee: GE GLOBAL SOURCING LLC, Norwalk, CT (US)

( * ) Notice: Subject to any disclaimer, the term of this patent is extended or adjusted under 35 U.S.C. 154(b) by 246 days.

(21) Appl. No.: 15/873,878

(22) Filed: Jan. 17, 2018

(65) Prior Publication Data
US 2018/0202977 A1  Jul. 19, 2018

Related U.S. Application Data

(60) Provisional application No. 62/446,962, filed on Jan. 17, 2017.

(51) Int. Cl.
| | | |
|---|---|---|
| *G01N 29/26* | (2006.01) | |
| *B61K 9/10* | (2006.01) | |
| *B61L 15/00* | (2006.01) | |
| *B61L 23/04* | (2006.01) | |
| *G01N 29/06* | (2006.01) | |
| *G01N 29/28* | (2006.01) | |

(52) U.S. Cl.
CPC ............. *G01N 29/262* (2013.01); *B61K 9/10* (2013.01); *B61L 15/0072* (2013.01); *B61L 23/042* (2013.01); *B61L 23/044* (2013.01); *G01N 29/0645* (2013.01); *G01N 29/28* (2013.01); *G01N 2291/0234* (2013.01); *G01N 2291/106* (2013.01); *G01N 2291/2623* (2013.01); *G01N 2291/2638* (2013.01)

(58) Field of Classification Search
CPC .. G01N 29/04; G01N 29/262; G01N 29/0645; G01N 29/28; G01N 2291/0234; G01N 2291/106; G01N 2291/2623; G01N 2291/2638; B61K 9/10; B61L 15/0072; B61L 23/042; B61L 23/044
USPC ........................................................ 73/636
See application file for complete search history.

(56) References Cited

U.S. PATENT DOCUMENTS

| | | | | |
|---|---|---|---|---|
| 3,978,712 A | * | 9/1976 | Cowan | G01B 17/06 73/598 |
| 4,662,224 A | * | 5/1987 | Turbe | G01N 29/11 73/636 |
| 4,689,995 A | * | 9/1987 | Turbe | G01N 29/265 73/634 |
| 5,777,891 A | * | 7/1998 | Pagano | G01N 29/0609 702/39 |

(Continued)

*Primary Examiner* — Octavia Hollington
(74) *Attorney, Agent, or Firm* — Christopher R. Carroll; The Small Patent Law Group, LLC

(57) ABSTRACT

A method and system for inspecting a rail profile include using ultrasonic phased arrays. Determined anomalies, such as material flaws like volumetric defects and cracks, in a fluid-immersed rail profile are detected by employing one or more phased array probes located proximate the rail profile. Electronic delays and beam steering and focusing can be employed to tailor the inspection to the rail geometry.

19 Claims, 24 Drawing Sheets

(56) References Cited

U.S. PATENT DOCUMENTS

| | | | |
|---|---|---|---|
| 8,820,166 B2* | 9/2014 | Wigh | G01N 29/043 73/649 |
| 9,010,186 B2* | 4/2015 | Pagano | G01N 29/04 73/636 |
| 9,950,715 B2* | 4/2018 | Lanza di Scalea | G01B 17/00 |
| 2010/0204857 A1* | 8/2010 | Forrest | B61L 27/0094 701/19 |

* cited by examiner

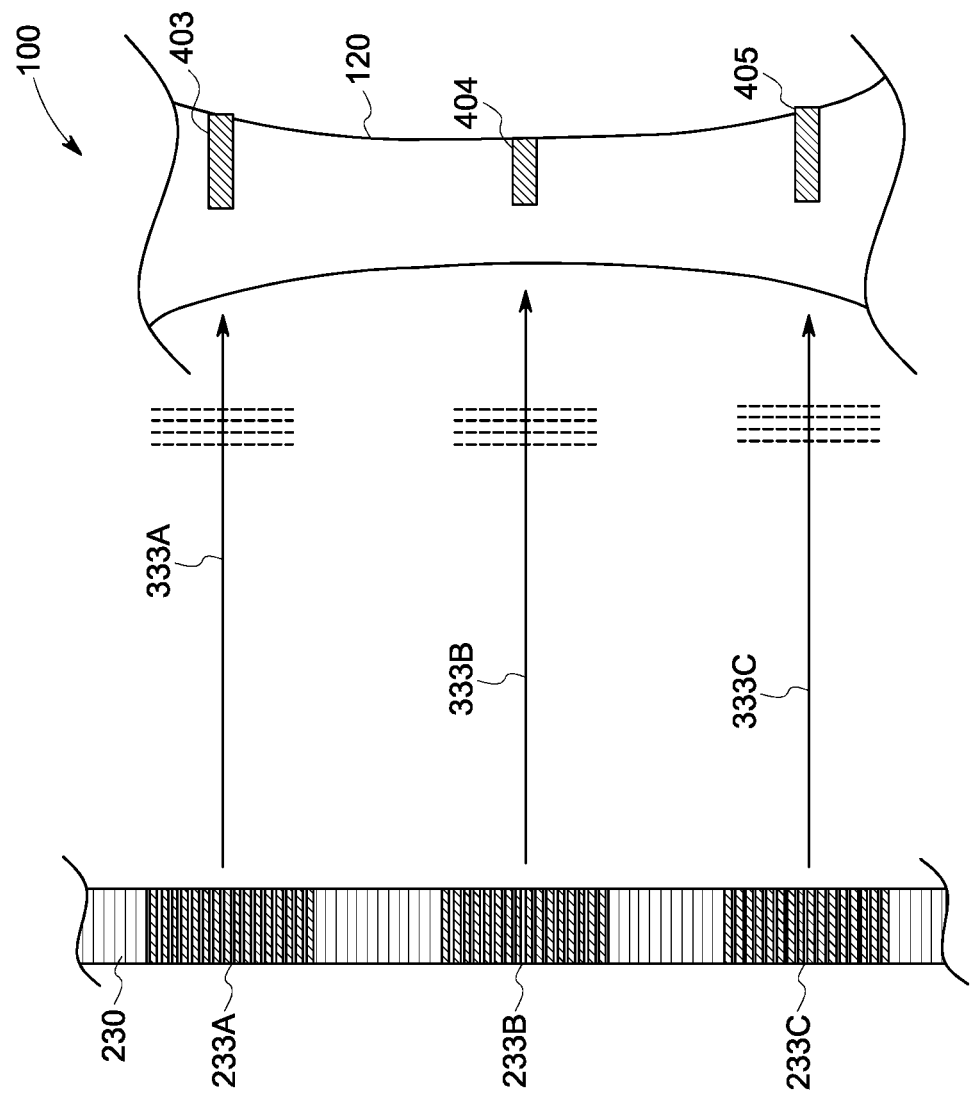

METHOD AND SYSTEM FOR INSPECTING
A RAIL PROFILE USING PHASED ARRAY
TECHNOLOGY

CROSS-REFERENCE TO RELATED
APPLICATION

This application claims the benefit of and priority to U.S. Patent Application Ser. No. 62/446,962, filed Jan. 17, 2017, and entitled METHOD AND SYSTEM FOR INSPECTING A RAIL PROFILE USING PHASED ARRAY TECHNOLOGY, the entirety of which is incorporated herein by reference.

BACKGROUND

The subject matter disclosed herein relates to a method and system for inspecting a rail profile using phased array technology.

Nondestructive testing devices can be used to inspect test objects to detect and analyze anomalies in the objects. Nondestructive testing typically involves placing one or more probes on or near the surface of the test object in order to perform testing of the underlying structure. One method of nondestructive testing employs ultrasonic acoustic waves.

Generally, an ultrasonic testing system includes an ultrasonic probe for transmitting and receiving ultrasonic acoustic waves to and from a test object, and a probe cable for connecting the ultrasonic probe to an ultrasonic test unit that includes a display for viewing the test results. In an ultrasonic testing system, electrical pulses are fed from the ultrasonic test unit to an ultrasonic probe where they are transformed into acoustic pulses by one or more ultrasonic transducers (e.g., piezoelectric elements) in the ultrasonic probe. During operation, electrical pulses are applied to the electrodes of one or more ultrasonic transducers, thus generating ultrasonic acoustic waves that are transmitted to the test object to which the probe is coupled, either directly on the surface of the test object or, e.g., through water in which the test object is immersed. Conversely, when an ultrasonic acoustic wave is reflected from the test object and contacts the surface of the ultrasonic transducer(s), it causes the transducer(s) to vibrate, generating a voltage that is detected as a received signal by the ultrasonic test unit. As the ultrasonic acoustic waves pass through the test object, various reflections, called echoes, occur as the ultrasonic acoustic waves interact with anomalies within the test object.

When inspecting an object with a conventional, single element ultrasonic probe, the location and orientation of the ultrasonic probe is changed several times to inspect different regions of the object. In order to inspect the full volume of the object, it may be necessary to scan the object dozens of times at different angles and locations, each time relocating and reorienting the ultrasonic probe, which can be time consuming. Alternatively, multiple single element ultrasonic probes can be used to inspect different regions of the object, positioning each of the probes at different locations on or near the object. However, the use of multiple single element ultrasonic probes can make the test system expensive and positioning the multiple single element ultrasonic probes based on the unique shape of the test object can require complex testing mechanics.

For example, ultrasonic inspection is currently used to inspect a rail profile 100 for volumetric defects. As shown in FIG. 1, a rail profile 100 includes a head 110, a web or web interface 120, and a foot/base 130; the web 120 interconnects the head 110 and the base 130. A rail profile (i.e., rail) may be made of steel or another metal, and used (e.g., in parallel pairs) as a track for a rail vehicle.

In order to adequately inspect the head 110, the web 120, and the foot/base 130, a significant number of conventional, single element ultrasonic probes must be used (e.g., 15-20) to cover the test areas. In a conventional automated ultrasonic testing system for inspecting a rail profile, squirter technology is used to provide water coupling between the single element ultrasonic probes and the surface of the rail profile. Even using all of those single element ultrasonic probes at particular locations with respect to the rail profile 100, there are portions of the rail profile 100 that are not inspected. Furthermore, since there are dozens of different designs and geometries for rail profiles, the specific locations of the single element ultrasonic probes with respect to the different rail profiles need to be determined and extensive mechanical adjustments are required for each different rail profile.

BRIEF DESCRIPTION

A method and system for inspection using phased array technology is disclosed.

In embodiments, a method and system for inspecting a rail profile include use of phased array probes for determining anomalies in the rail profile. Determined anomalies (e.g., flaws) may include, for example, volumetric defects and cracks. In a fluid immersed rail profile, such anomalies may be detected by employing one or more phased array probes located proximate the rail profile. Electronic delays, beam steering, and beam focusing can be employed to tailor the inspection to the rail geometry.

In one embodiment, a method for ultrasonic inspection of a rail profile having a head, a web, and a base with an ultrasonic inspection system is described. The ultrasonic inspection system includes an ultrasonic probe having a plurality of transducer elements. The method includes defining a first virtual probe within the ultrasonic probe. Defining the first virtual probe includes selecting a first subset of transducer elements to emit a first ultrasonic beam toward the rail profile. The method additionally includes defining a second virtual probe within the ultrasonic probe. Defining the second virtual probe includes selecting a second subset of transducer element, different from the first set of transducer elements, to emit a second ultrasonic beam toward the rail profile. The method additionally includes directing the first ultrasonic beam and second ultrasonic beam for detection of a flaw in the rail profile and emitting the first ultrasonic beam and the second ultrasonic beam. A reflected signal from the rail profile is received and analyzed to detect the flaw in the rail profile.

In an embodiment, an ultrasonic inspection system includes a plurality of ultrasonic probes comprising a first ultrasonic probe, a second ultrasonic probe, a third ultrasonic probe, and a fourth ultrasonic probe. The first ultrasonic probe is positioned for inspection of a rail head, the second ultrasonic probe is positioned for inspection of a rail base, and the third ultrasonic probe and fourth ultrasonic probe are each positioned for inspection of the rail head, the rail base, and a rail web that interconnects the rail head and the rail base. The system may be further configured as described elsewhere herein.

In an embodiment, an ultrasonic inspection system includes a plurality of ultrasonic probes comprising plural transducer elements, where each of the ultrasonic probes includes a respective plurality of the plural transducer elements in an array, and where the ultrasonic probes are arranged around a space (e.g., defined by a vessel) that is configured to receive a rail for inspection. The system also includes a control unit having one or more processors electrically connected to the ultrasonic probes. The one or more processors are configured to select a first subset of the plural transducer elements to emit a first ultrasonic beam toward at least a portion of the rail, when the rail is received in the space, and to select a second subset of the plural transducer elements, different from the first subset of the plural transducer elements, to emit a second ultrasonic beam toward the portion of the rail. The one or more processors are also configured to direct the first ultrasonic beam and the second ultrasonic beam for detection of a determined anomaly in the rail. The may include controlling emission of the first ultrasonic beam and the second ultrasonic beam (the plural transducer elements are configured to receive a reflected signal from the rail responsive to the first ultrasonic beam and the second ultrasonic beam impinging upon the rail) and analyzing the reflected signal to detect the determined anomaly in the rail.

The method and system for inspecting a rail profile using phased array technology may result in a reduction or elimination of the need to adjust the location of the ultrasonic probes when inspecting different rail profiles since the virtual probe arrangement can be easily changed and the ultrasonic beams transmitted by the phased array probes can be steered to adapt to the surface of the rail profile without mechanical adjustment of the probes. This reduces the need for complex mechanical systems that are prone to failure and require maintenance. Use of phased array probes to inspect the rail profile improves upon conventional rail profile testing systems by improving (increasing) the signal-to-noise ratio by directing the ultrasonic beam toward the defect, increasing testing sensitivity, providing greater testing coverage of the rail profile that allows for detection and inspection of special defects beyond standard requirements, increasing the probability of detection (POD) of defects, improving the identification of the size of defects, and increasing productivity by using phased array evaluations techniques (e.g., PaintBrush, acoustic holography).

The above embodiment is exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

FIG. 6A is a diagram of one of the phased array probes of the exemplary ultrasonic inspection system inspecting the web section of an exemplary rail profile with a top flat bottom hole, a center flat bottom hole, and a bottom flat bottom hole where the ultrasonic beams are emitted using zero delay law;

DETAILED DESCRIPTION

Embodiments of the disclosed subject matter provide a method and system for inspection using phased array technology. Various materials may be subject to inclusions, defects, cracks, voids and the like (collectively "anomalies") which may occur over time in, or be formed during manufacture of, solid items of manufacture having use in a multitude of industries (for ease of use, collectively, "rail profile"). In one embodiment, the rail profile is immersed in a coupling medium or fluid, e.g. water, and surrounded by one or more phased array probes. So-called virtual probes can be formed by exciting individual transducer elements. Applying electronic delay during excitation, the emitted ultrasonic beams can be steered to contact the surface of the rail profile at a predetermined angle, transmitting longitudinal and/or transversal waves in the material upon refraction. In another embodiment, the electronic delay can be used to focus the ultrasonic beam, thereby increasing sensitivity at a chosen depth. As the steering parameters, as well as the entire virtual probe arrangement, can be changed electronically, this system reduces or eliminates the need to physically adjust the location of the ultrasonic probes when changing between rail profiles for inspection. This reduces the need for complex mechanical systems that are prone to failure and require maintenance. Other embodiments are within the scope of the disclosed subject matter.

A phased array probe has a plurality of electrically and acoustically independent ultrasonic transducers or transducer elements mounted in a single housing. By varying the timing of the electrical pulses applied to the transducer elements and/or which transducer elements are activated (forming virtual probes), a phased array ultrasonic probe located at a certain physical position can perform a scan through the test object to try to detect anomalies without physical movement of the phased array ultrasonic probe. The ultrasonic waves received at the various angles can be processed to produce an A-Scan image of the test object, allowing visual identification of anomalies. Thus, from a single position, a single phased array probe can inspect a large portion of a test object, whereas a conventional ultrasonic probe may only inspect finite volumes at individual positions. As part of the inspection process and analysis, the inventive system may retrieve rail profile data from a database. This rail profile data may relate to, for example, at least one of the rail profile manufacturing information, the rail profile material composition, and the rail profile historical usage or its age. With this additional information, the health and status of the rail profile may be determined.

Figure 1:
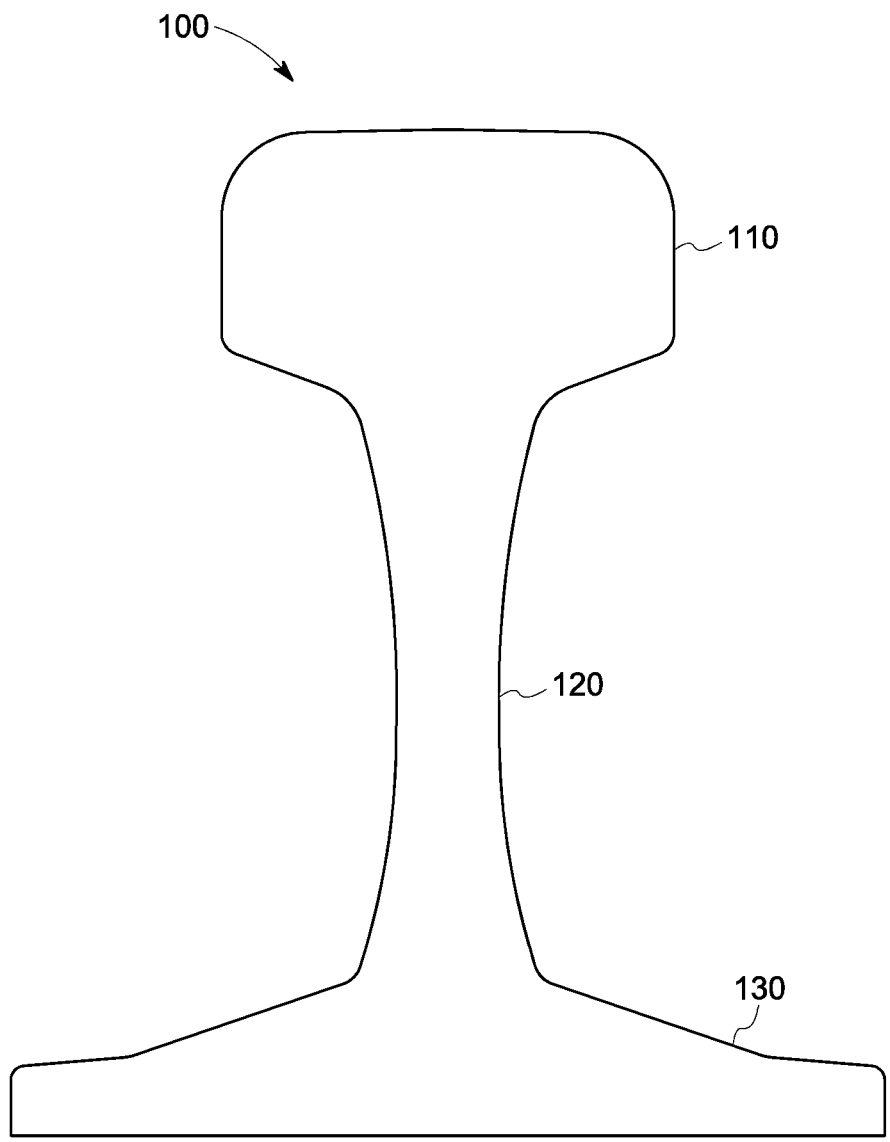
FIG. 1 is a cross-section of an exemplary rail profile, including the head, web, and foot/base sections.
Figure 2:
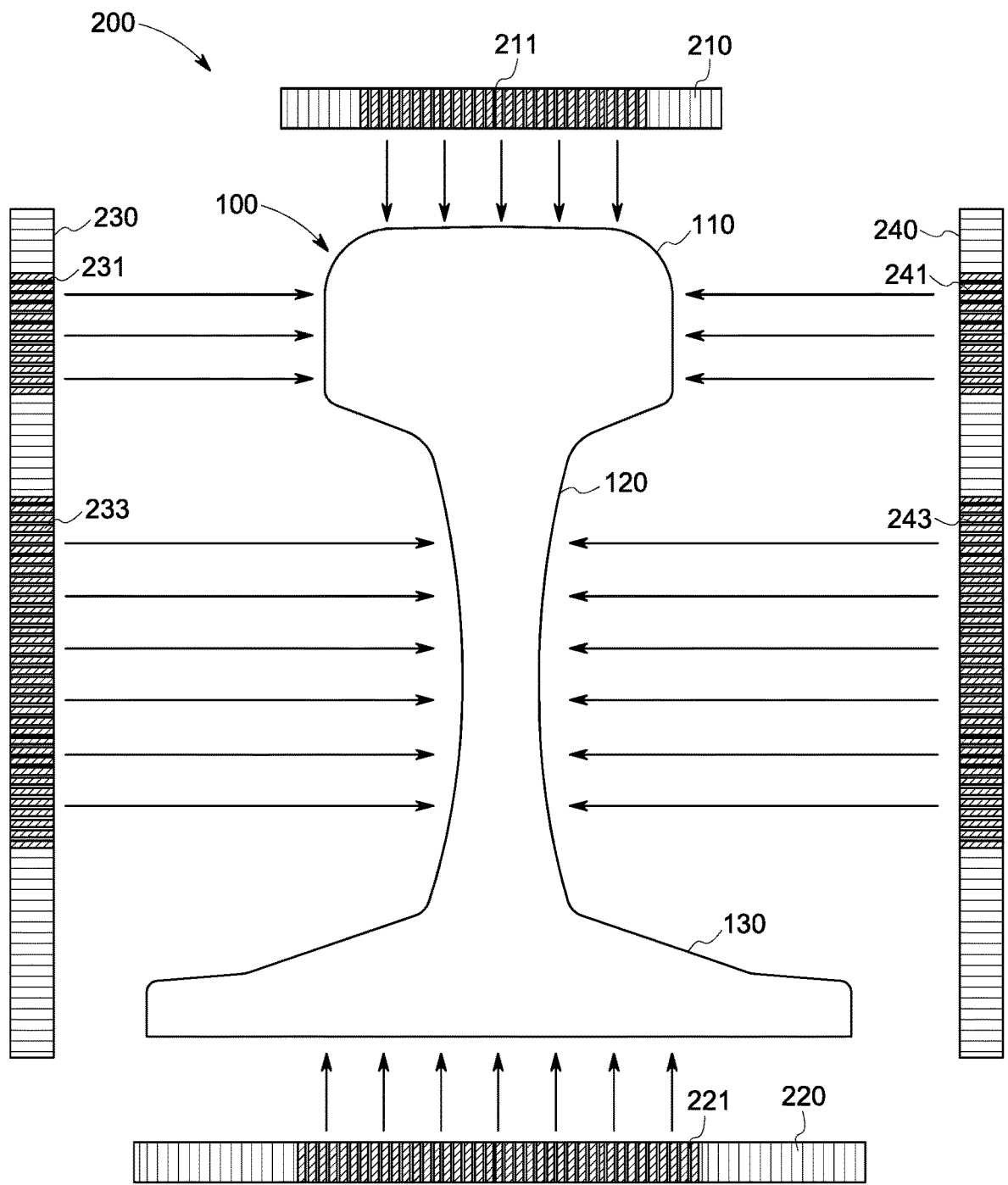
FIG. 2 is a diagram of an exemplary ultrasonic inspection system using phased array probes to inspect an exemplary rail profile.

FIG. 2 is a diagram of an exemplary ultrasonic inspection system 200 using four phased array probes 210, 220, 230, 240 to inspect an exemplary rail profile 100. In one embodiment, the system 200 includes a first phased array probe 210 for inspecting the head 110 of the rail profile 100, a second phased array probe 220 for inspecting the foot/base 130 of the rail profile 100, a third phased array probe 230 for inspecting the head 110 and the web 120 of the rail profile 100, and a fourth phased array probe 240 for inspecting the head 110 and the web 120 of the rail profile 100. In the exemplary embodiment, the rail profile 100 is immersed in a fluid (e.g., water), which couples the surface of the rail profile 100 to the phased array probes 210, 220, 230, 240. It will be understood the total number, location (e.g., water path distances), and type (e.g., number of transducer elements, probe center frequency, aperture size) of phased array probes can be selected based on the rail geometries under consideration and the ultrasonic testing parameters. The configuration shown in the embodiment of the ultrasonic inspection system 200 is one example and other configurations are within the scope of the disclosed subject matter. Note that suitable coupling fluids may include liquids and gels. The liquid may be water or oil, or there may be additional liquids present (e.g., corrosion inhibitors, metal surface treatments, and the like). The gel may have thickening agents, as well as any substances useful in the liquids. Further, contact with the liquid or gel may include enveloping the fluid in a compliant, flexible container or membrane so as to facilitate effective coupling, but prevent actual fluidic contact, with the rail profile portion that is being inspected.

In the illustrated embodiment, a virtual probe 211 is defined across the phased array probe 210 for inspection of the head 110 of the rail profile 100. Similarly, a virtual probe 221 is defined on the phased array probe 220 for inspection of the foot/base 130 of the rail profile 100. As the phased array probes 230 and 240 cover the entire height of the rail profile 100, the probes 230, 240 can be used to inspect both the head 110 and the web 120 of the rail profile 100. Accordingly, multiple (distinct) virtual probes 231, 233, 241, 243 are defined across the probes 230, 240 directed toward individual sections of the rail profile 100.

Figure 3:
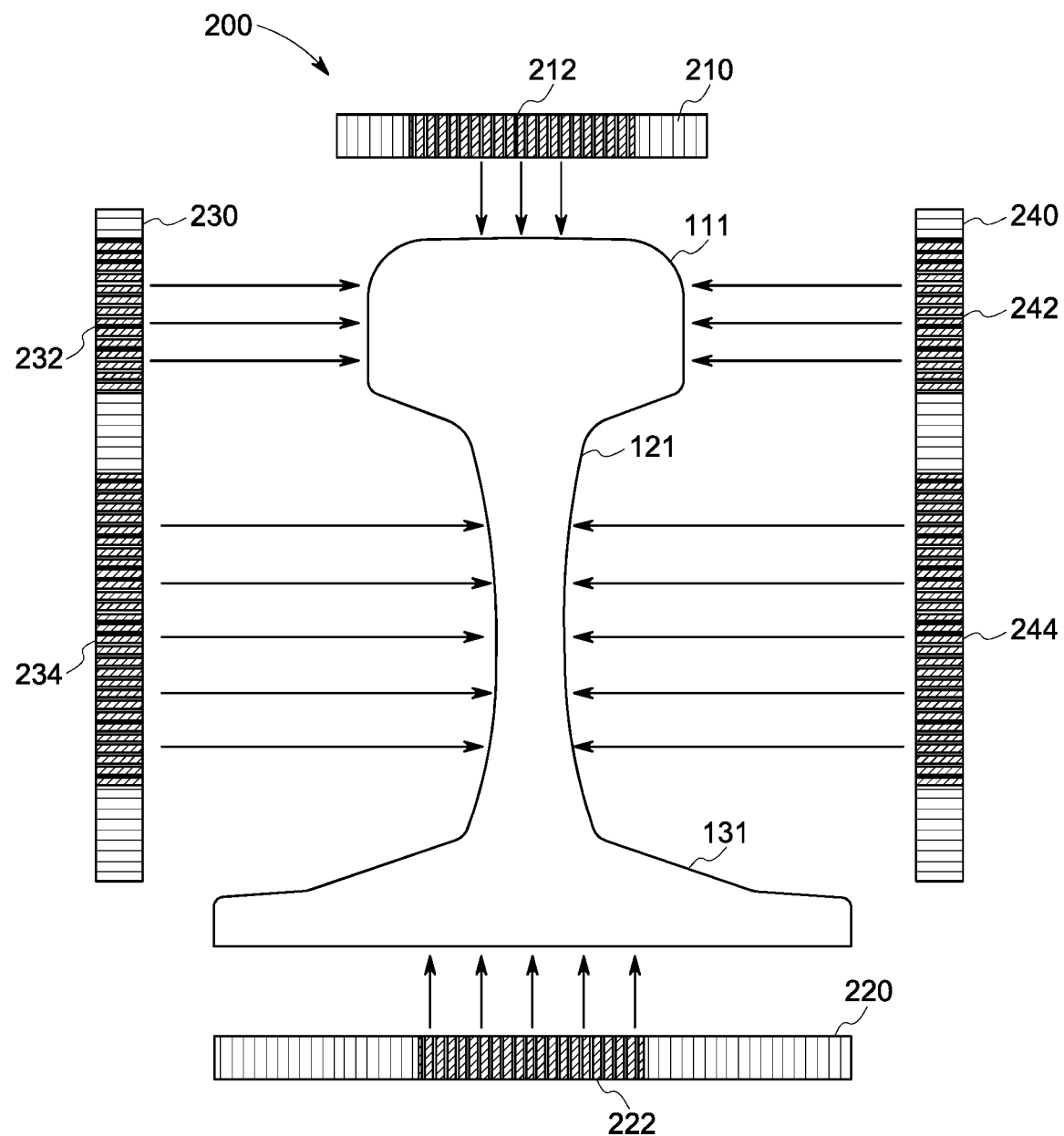
FIG. 3 is a diagram of the exemplary ultrasonic inspection system shown in FIG. 2, configured to inspect a different exemplary rail profile.
Figure 10:
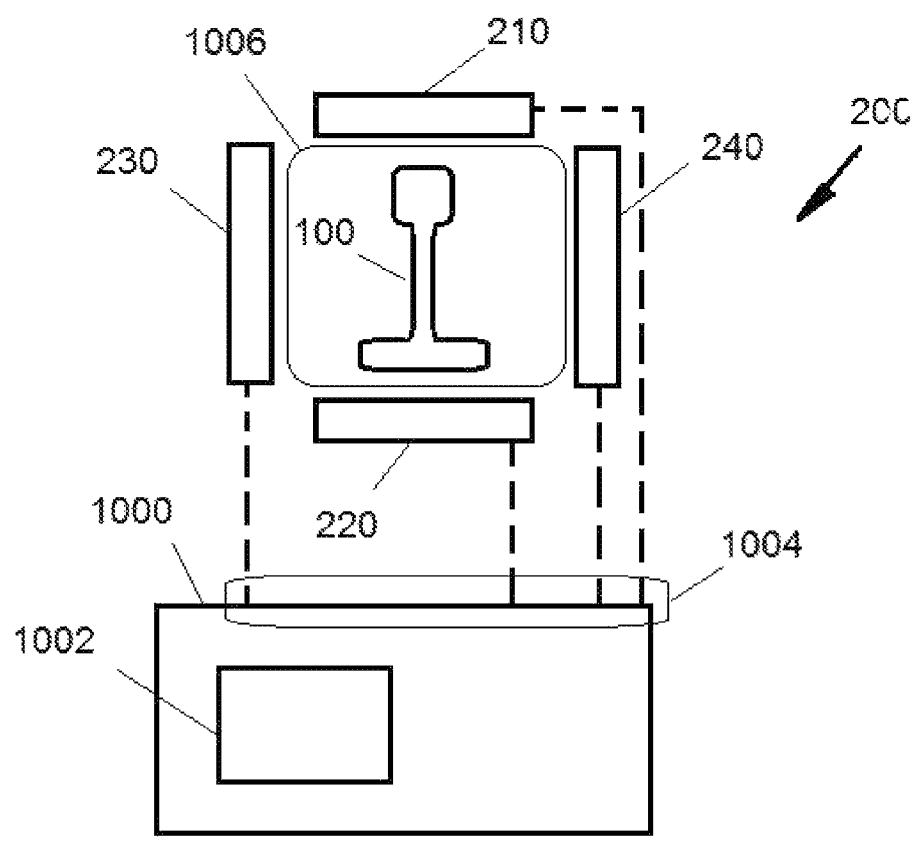
FIG. 10 is a schematic diagram of aspects of the ultrasonic inspection system, as may be part of and/or used with any of the other embodiments described herein.

With reference to FIG. 10, the ultrasonic inspection system 200, as shown in FIG. 2, FIG. 3, etc., or as described in any of the other embodiments herein, may use or include a controller or control unit 1000 having one or more processors 1002 and an input/output (I/O) interface or terminal 1004. The I/O interface 1004 includes one or more connection ports for electrically connecting the four phased array probes 210, 220, 230, 240 to the processor(s) 1002 and related circuitry, e.g., the probes may be connected to the control unit by multi-conductor electrical lines or cables. The one or more processors are configured (e.g., they operate responsive to a program stored in a memory, and/or based on a circuit topology) to generate control signals for controlling the four phased array probes as described herein, to receive and process data/information from the four phased array probes as described herein, and to generate control signals (e.g., for controlling a display, and/or for storing information in memory, and/or for controlling another device, and/or for alerting an operator, etc.) based on the received and processed data/information; the control signals may be indicative of inspection results and/or analysis of inspected rail profiles (e.g., defects or anomalies may be identified, and/or differences in internal material structure may be identified, quantified, or otherwise flagged). In use, the one or more processors may be configured to control the probes to emit ultrasonic signals, as described herein, which impinge upon the rail, and a portion or aspect of which are reflected back for reception by the probes and analysis by the processors (e.g., the reflected signals include information of the internal and surface structure of the rail). The system may also include a vessel 1006 that defines a space for receiving a rail to be inspected, and which is configured to contain a fluid for facilitating the transfer of ultrasonic beams between the arrays and the rail.

FIG. 3 is a diagram of the ultrasonic inspection system 200 using the phased having array probes 210, 220, 230, 240 configured to inspect a rail profile 100 having a different geometry than that of the rail profile 100. To adapt the system 200 to the new rail profile 110, the virtual probe arrangement for all the surrounding phased array probes is modified. In the illustrated embodiment, virtual probes 212 and 222 are defined, having a reduced size when compared to their counterparts 211 and 221, shown in FIG. 2. Similarly, the defined virtual probes 232, 234, 242, 244 are offset by a number of elements along the phased array probes 230 and 240, when compared to their counterparts 231, 233, 241, 243, shown in FIG. 2. Note that all of these adaptations can be done electronically (e.g., by the control unit), without requiring mechanical repositioning of the phased array probes when changing the rail geometry.

Figure 4A:
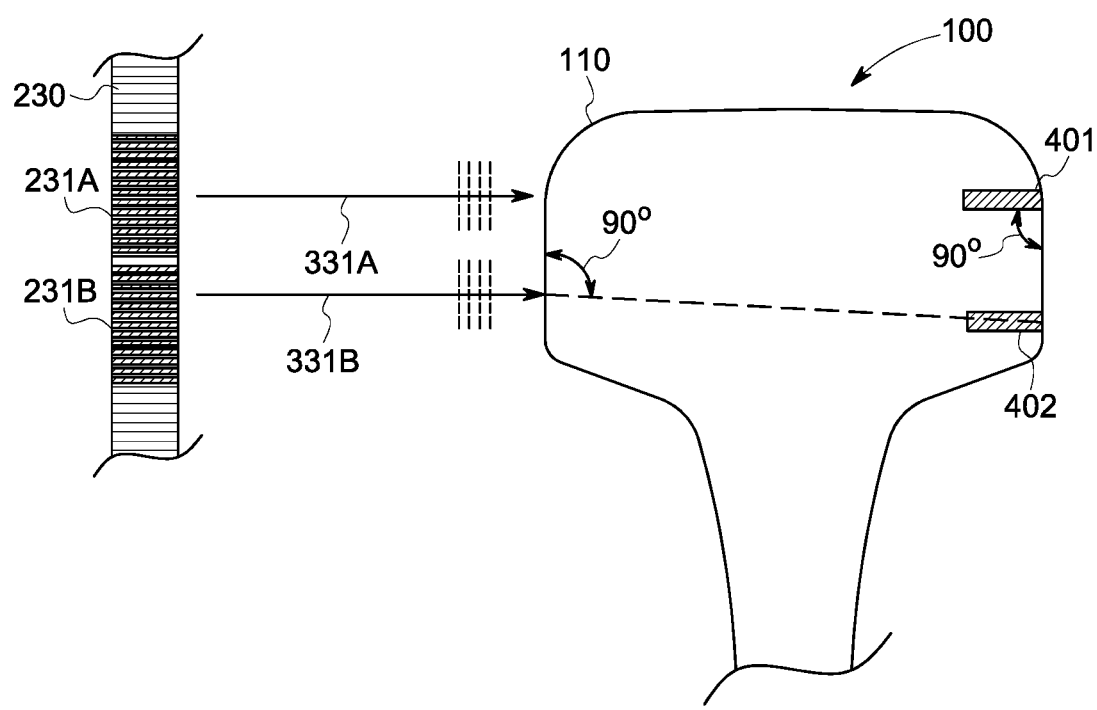
FIG. 4A is a diagram of one of the phased array probes of the exemplary ultrasonic inspection system inspecting the head section of an exemplary rail profile with a top flat bottom hole and a bottom flat bottom hole where the ultrasonic beams are emitted using zero delay law.
Figure 4B:
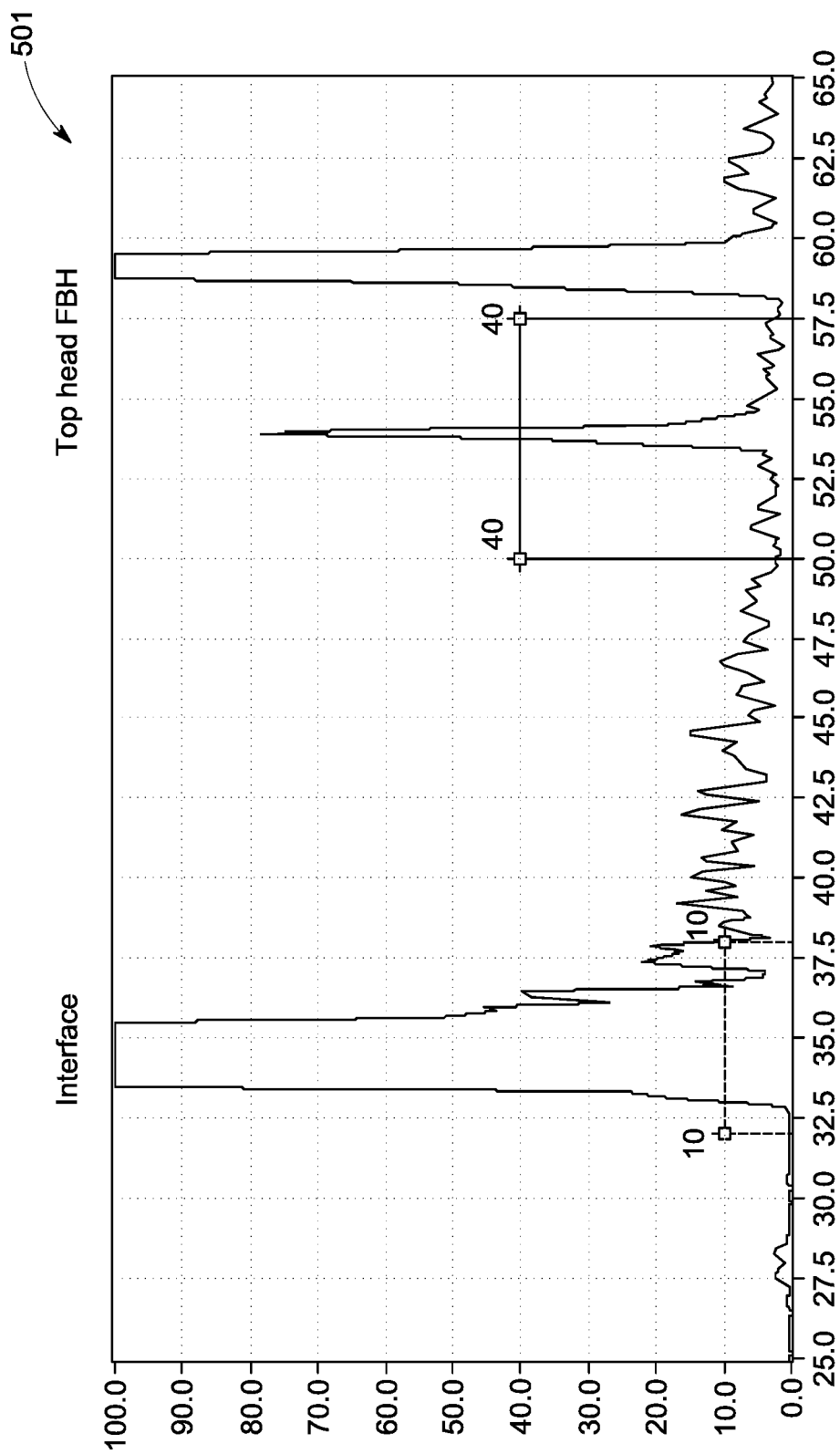
FIG. 4B is an A-Scan display of the non-steered ultrasonic beam detecting the top flat bottom hole of the head of the rail profile of FIG. 4A.
Figure 4C:
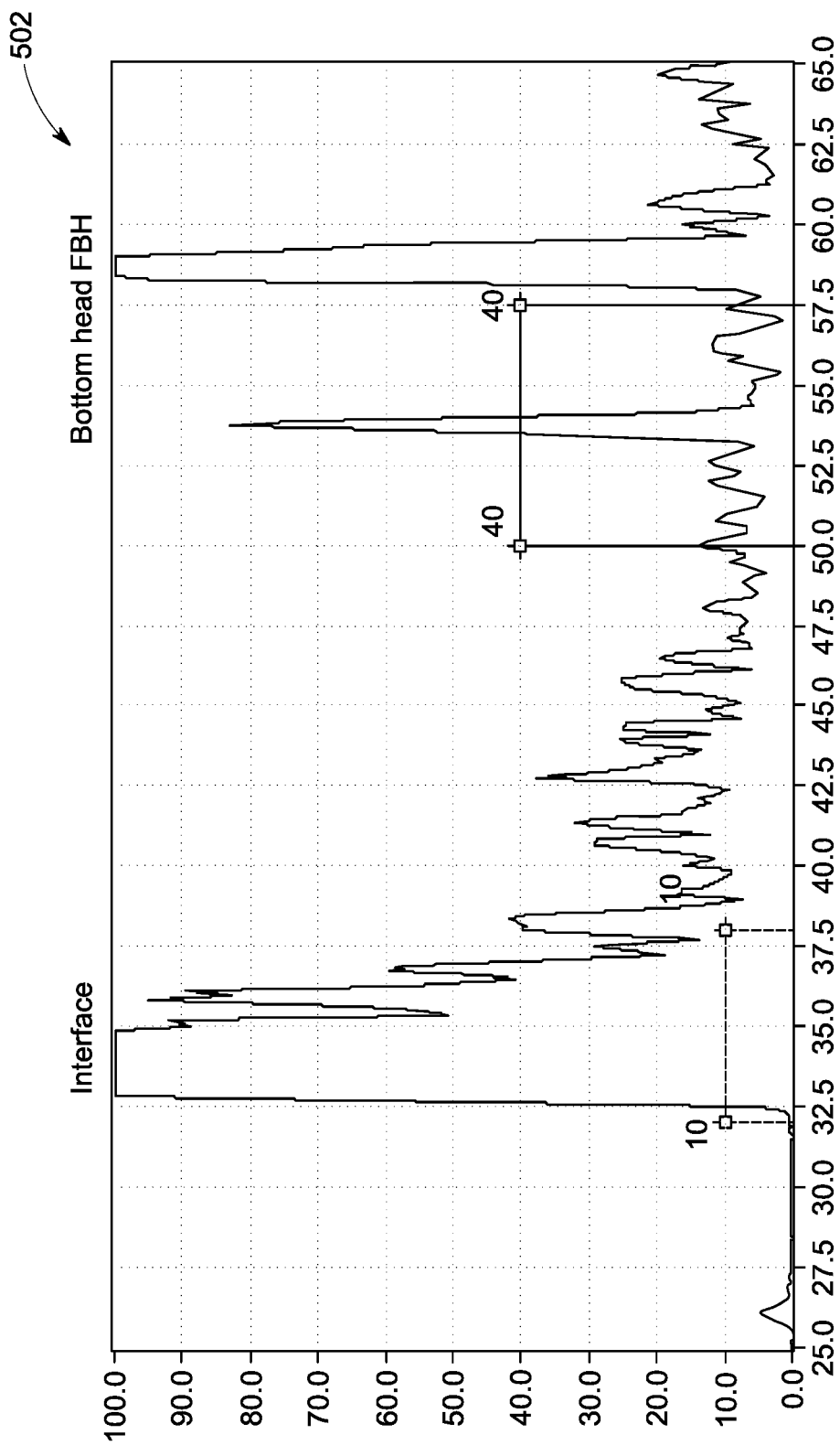
FIG. 4C is an A-Scan display of the non-steered ultrasonic beam detecting the bottom flat bottom hole of the head of the rail profile of FIG. 4A.

FIG. 4A is a diagram of a portion of the phased array probe 230 (FIG. 2) configured for inspection of the head 110 of the exemplary rail profile 100. In the illustrated embodiment, two flat bottom holes (FBH), top head FBH 401 and bottom head FBH 402, of identical size, are fabricated into the head 110 of the rail profile at various angles. The flat bottom holes (FBHs) 401, 402 act as reference reflectors, resembling volumetric defects that feature different orientations. To identify or detect the FBHs 401, 402, multiple virtual probes 231A, 231B are defined in the phased array probe 230, emitting ultrasonic beams 331A and 331B, respectively, at zero delay. FIG. 4B is the resulting A-Scan display 501 of the non-steered ultrasonic beam 331A detecting the top head FBH 401. FIG. 4C is the resulting A-Scan display 502 of the non-steered ultrasonic beam 331B, detecting the bottom head FBH 402. As illustrated, the amplification gain measured for the top head FBH 401 is 28.5 dB, while the amplification gain measured for the bottom head FBH 402 is 34 dB. Accordingly, even though both flat bottom holes 401, 402 are the same size, a size evaluation based on the reflector amplitudes, as determined based on the amplification gain, following non-steered ultrasonic beams would incorrectly indicate that the bottom head FBH 402 is smaller than the top head FBH 401 (i.e., larger amplification gain reading interpreted as smaller size anomaly, given similar sound paths).

Figure 5A:
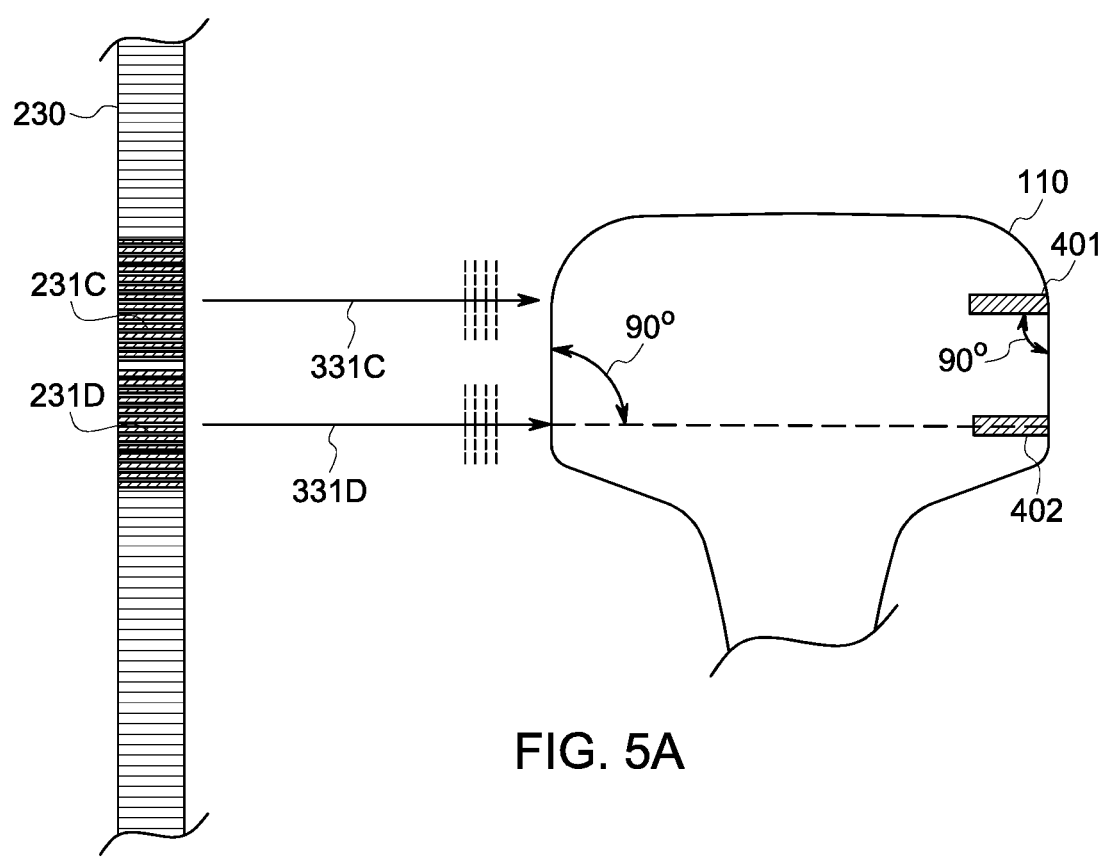
FIG. 5A is a diagram of one of the phased array probes of the exemplary ultrasonic inspection system inspecting the head section of an exemplary rail profile with a top flat bottom hole and a bottom flat bottom hole following beam steering to optimize the reflector amplitudes.
Figure 5B:
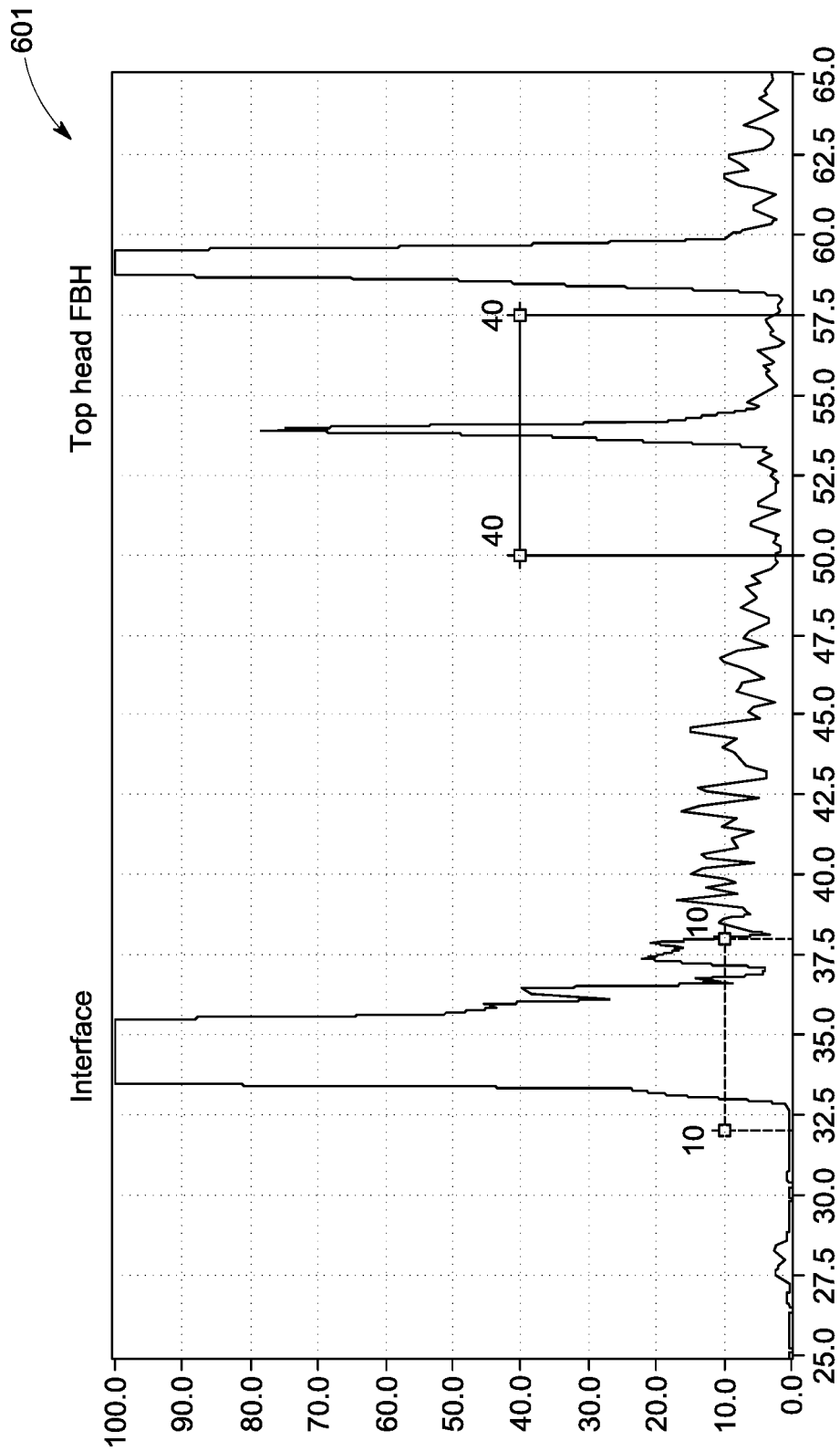
FIG. 5B is an A-Scan display of the steered ultrasonic beam detecting the top flat bottom hole of the head of the rail profile of FIG. 5A.
Figure 5C:
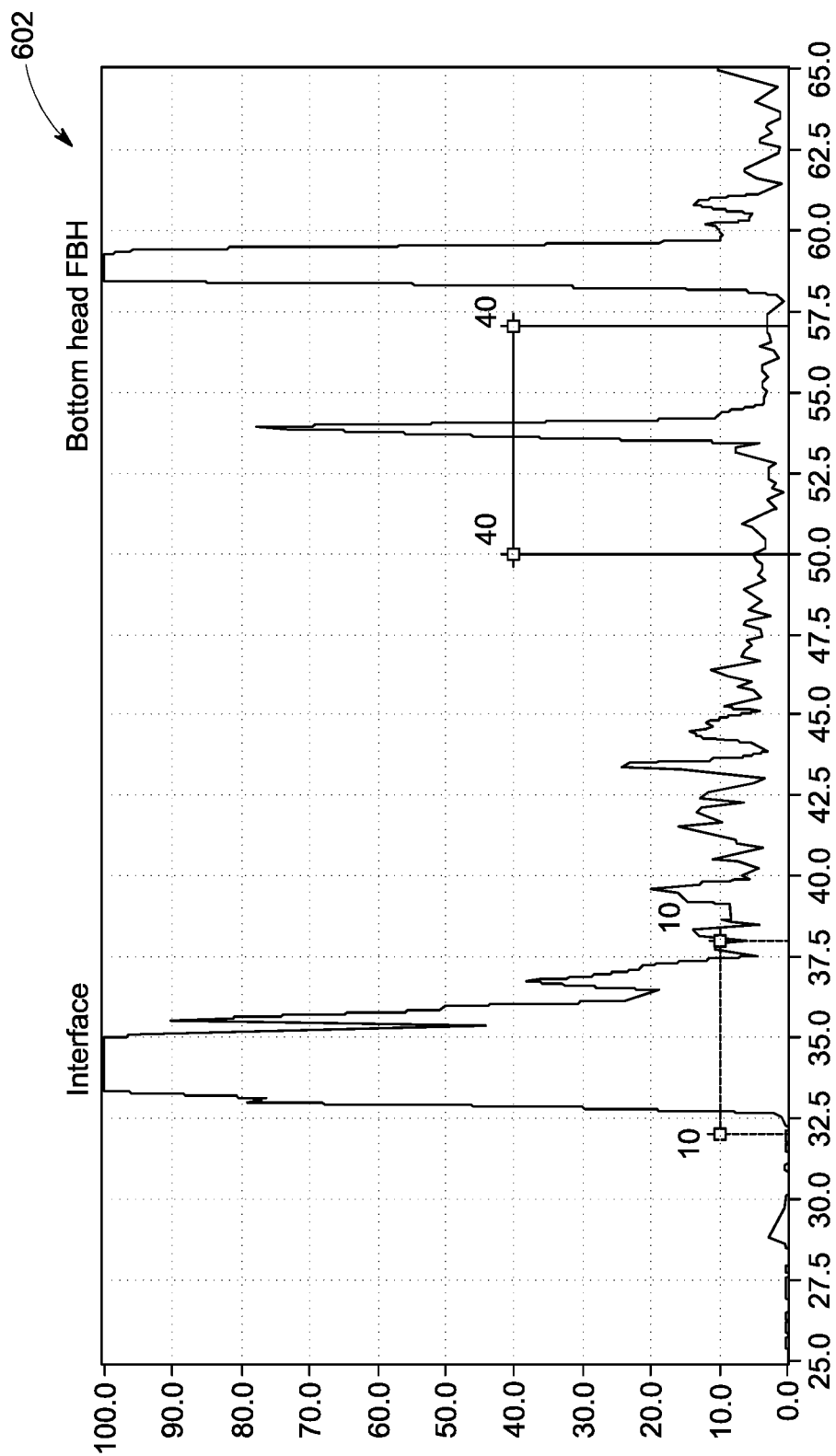
FIG. 5C is an A-Scan display of the steered ultrasonic beam detecting the bottom flat bottom hole of the head of the rail profile of FIG. 5A.

FIG. 5A is a diagram of the phased array probe 230 configured for inspection of the head 110 of the exemplary rail profile 100. Here, the defined virtual probes 231C, 231D emit ultrasonic beams 331C and 331D, respectively, with the delay optimized for detection of the individual flat bottom holes 401 and 402. In other words, the differing orientations of the flat bottom holes 401, 402 is taken into consideration. FIG. 5B is the resulting A-Scan display 601 of the steered ultrasonic beam 331C, detecting the top head FBH 401. FIG. 5C is the resulting A-Scan display 602 of the steered ultrasonic beam 331D detecting the bottom head FBH 402. By using optimized delay laws (designated sets of delays), the amplification gain is measured at 28 dB and 28.5 dB, respectively or almost identical for the two FBHs 401, 402. Accordingly, a size evaluation based on the reflector amplitude would conclude that the bottom head FBH 402 is the same size as the top head FBH 401. The overall lower gain will also improve the signal-to-noise-ratio, increasing the overall probability of detection (POD) during inspection.

As the exemplary measurements of FIGS. 4B-4C and 5B-5C demonstrate, the phased array system 200 is able to optimize the ultrasonic echo of differently oriented reflectors (e.g., holes 401, 402), which is helpful for the classification of defects based on their reflector amplitude. This change may be achieved by adapting the electronic delay and/or virtual probe arrangement, with no need for mechanical repositioning of the phased array probes.

Figure 6B:
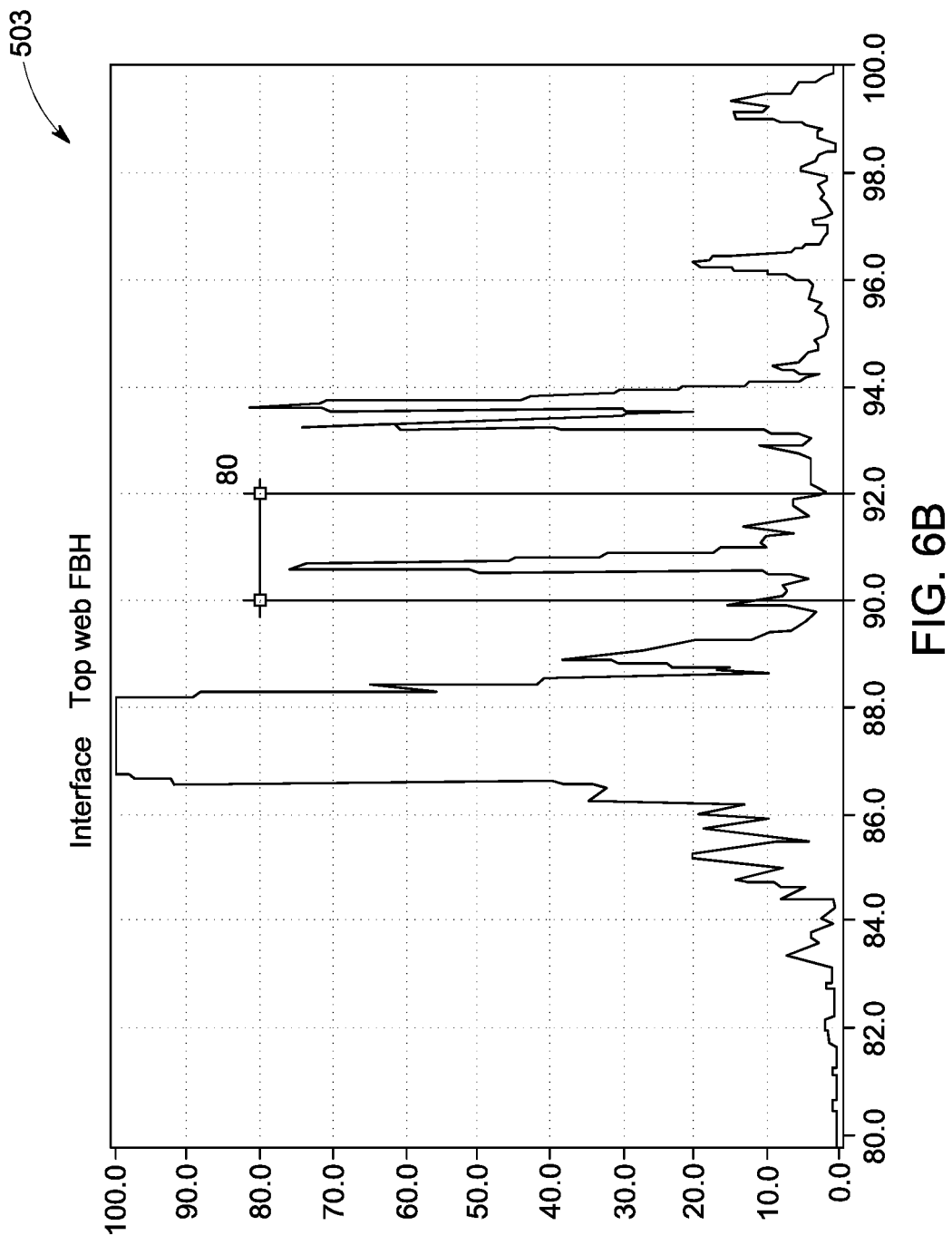
FIG. 6B is an A-Scan display of the non-steered ultrasonic beam detecting the top flat bottom hole of the web of the rail profile of FIG. 6A.
Figure 6C:
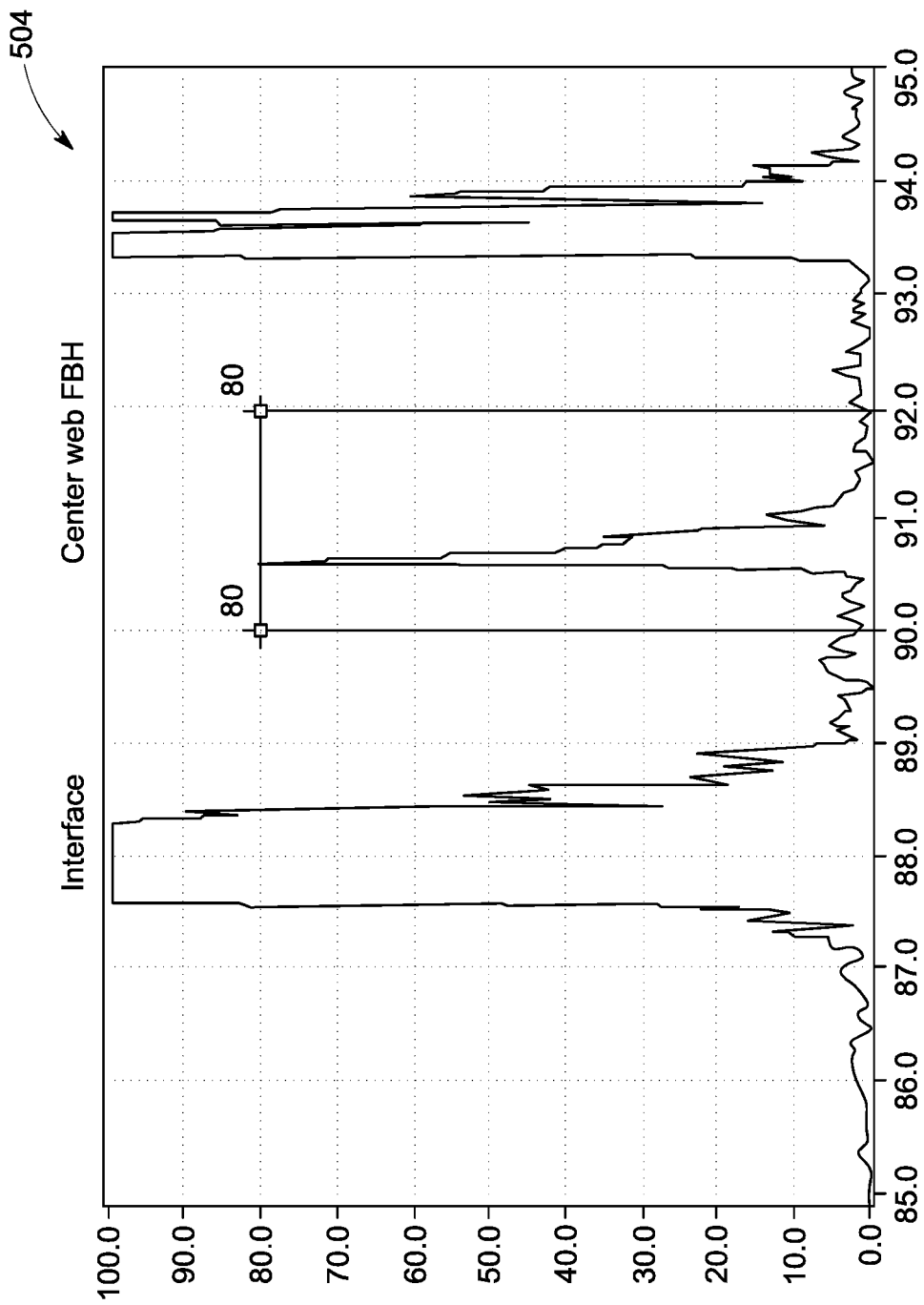
FIG. 6C is an A-Scan display of the non-steered ultrasonic beam detecting the center flat bottom hole of the web of the rail profile of FIG. 6A.
Figure 6D:
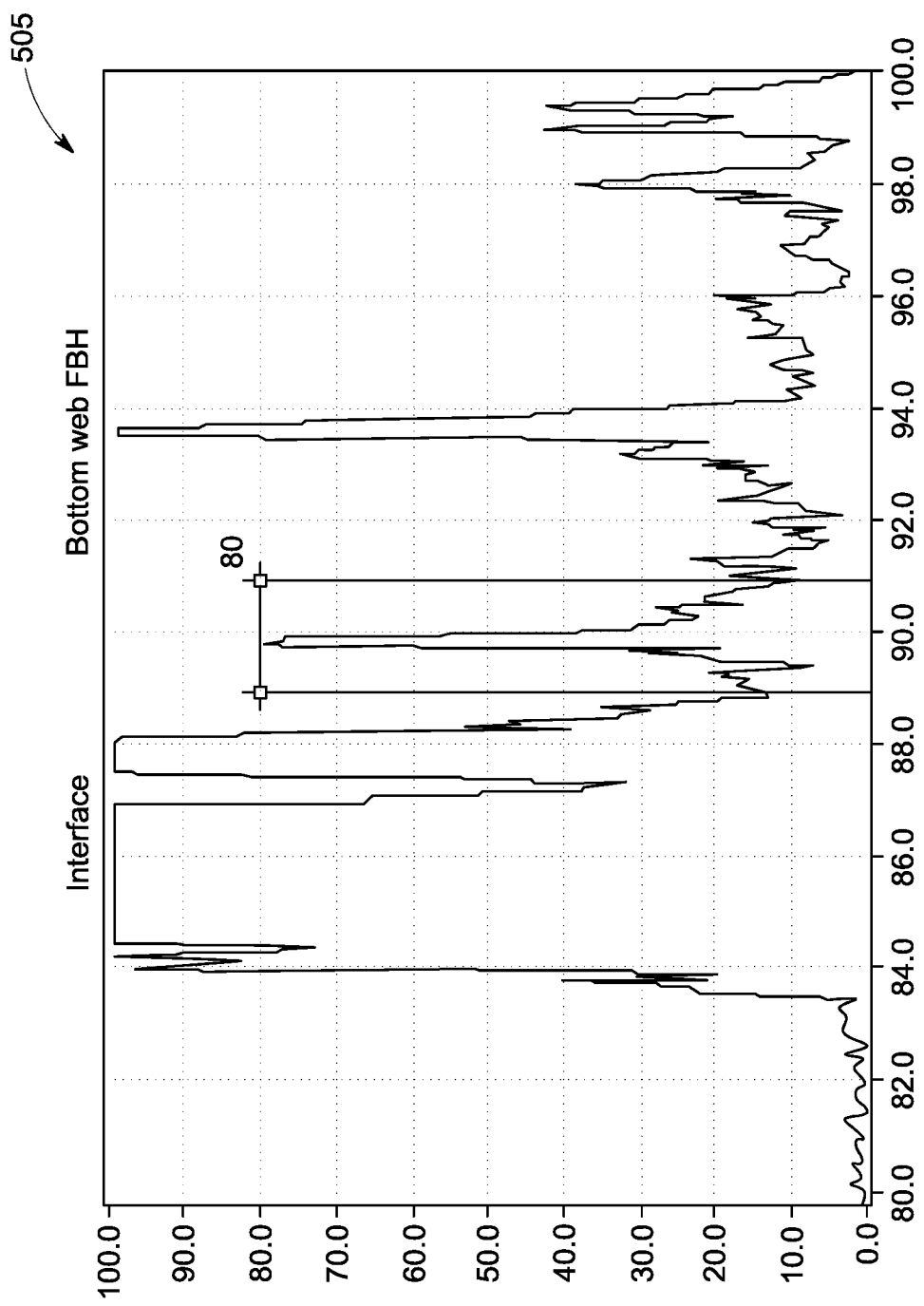
FIG. 6D is an A-Scan display of the non-steered ultrasonic beam detecting the bottom flat bottom hole of the web of the rail profile of FIG. 6A.

FIG. 6A is a diagram of the phased array probe 230 configured for inspection of the web 120 of the rail profile 100. In the illustrated embodiment, three flat bottom holes (FBH) 403, 404, 405 of identical size are fabricated into the web of the rail profile at different heights. The FBHs 403, 404, 405 act as reference reflectors, resembling volumetric defects that might be affected by the curvature of the web interface 403. To identify or detect the FBHs 403, 404, 405, multiple virtual probes 233A, 233B, 233C, are defined in the phased array probe 230, emitting non-steered ultrasonic beams 333A, 333B, and 333C, respectively, at zero delay. FIG. 6B is the resulting A-Scan display 503 of the non-steered ultrasonic beam 333A detecting the top web FBH 403. FIG. 6C is the resulting A-Scan display 504 of the non-steered ultrasonic beam 333B detecting the center web FBH 404. FIG. 6D is the resulting A-Scan display 505 of the non-steered ultrasonic beam 333C detecting the bottom web FBH 405. The amplification gain measured for the individual flat bottom holes 403, 404, and 405 is 36 dB, 33 dB, and 50 dB, respectively. As discussed before, these readings may incorrectly translate into different defect sizes in a reflector amplitude-based evaluation.

Figure 7A:
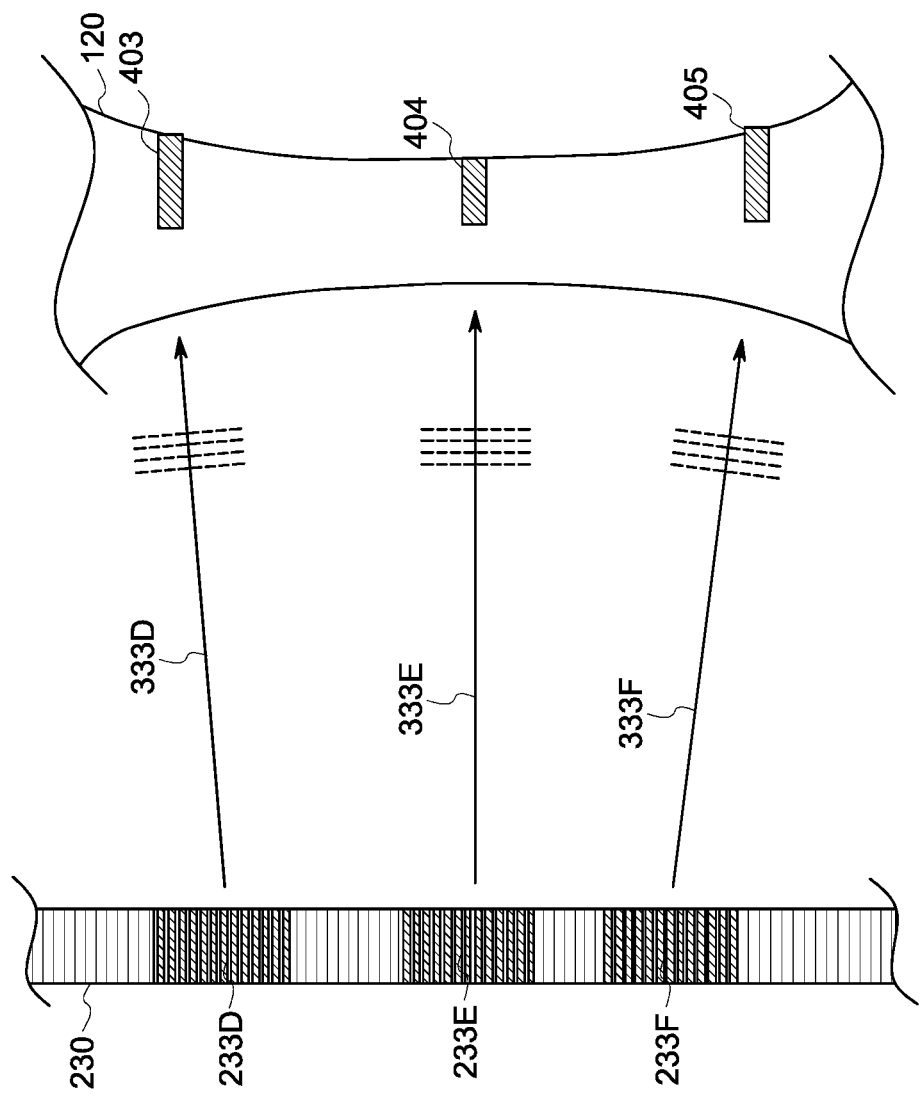
FIG. 7A is a diagram of one of the phased array probes of the exemplary ultrasonic inspection system inspecting the web section of an rail profile with a top flat bottom hole, a center flat bottom hole, and a bottom flat bottom hole following beam steering to optimize the reflector amplitudes.
Figure 7B:
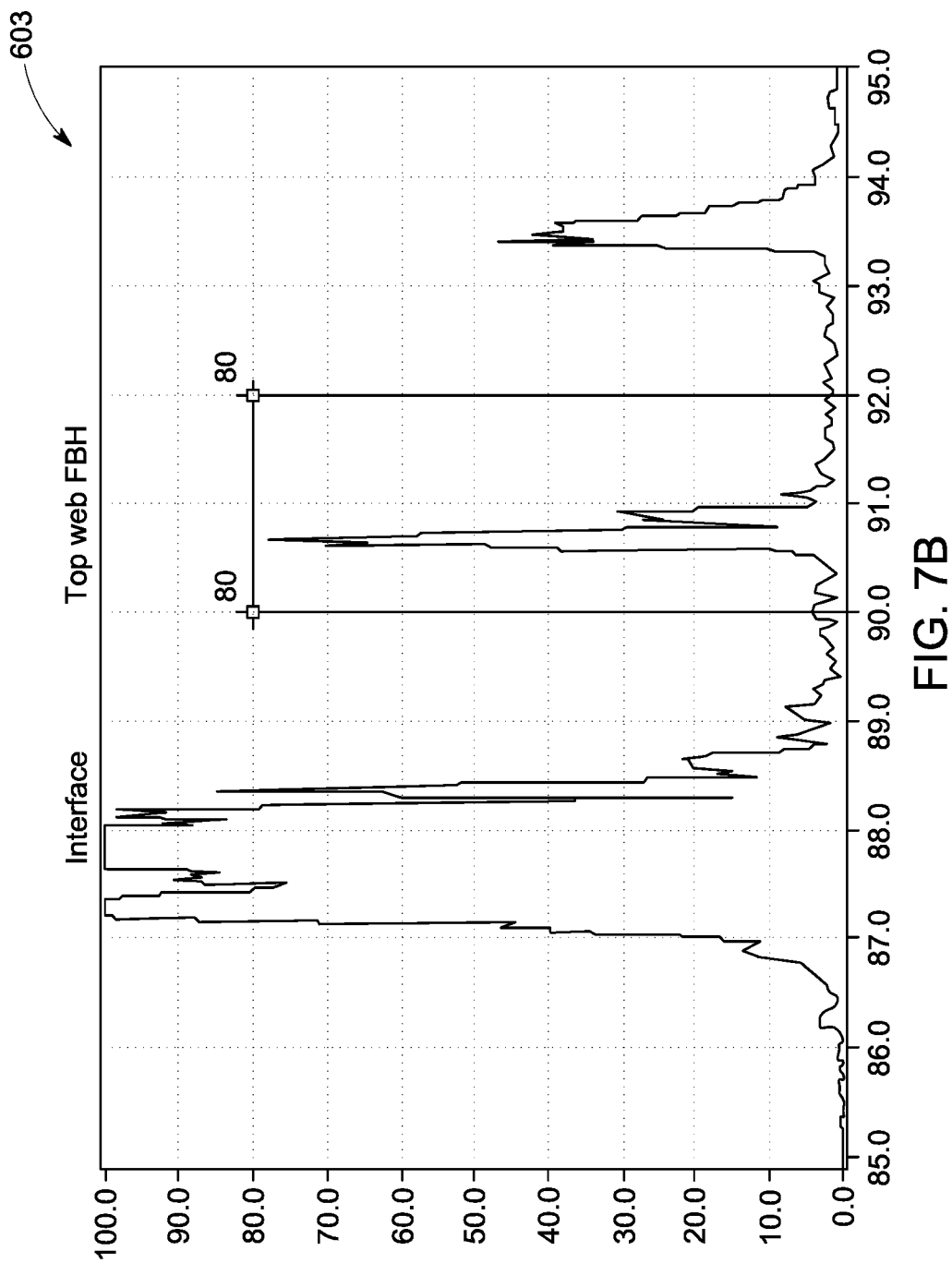
FIG. 7B is an A-Scan display of the steered ultrasonic beam detecting the top flat bottom hole of the web of the rail profile of FIG. 7A.
Figure 7C:
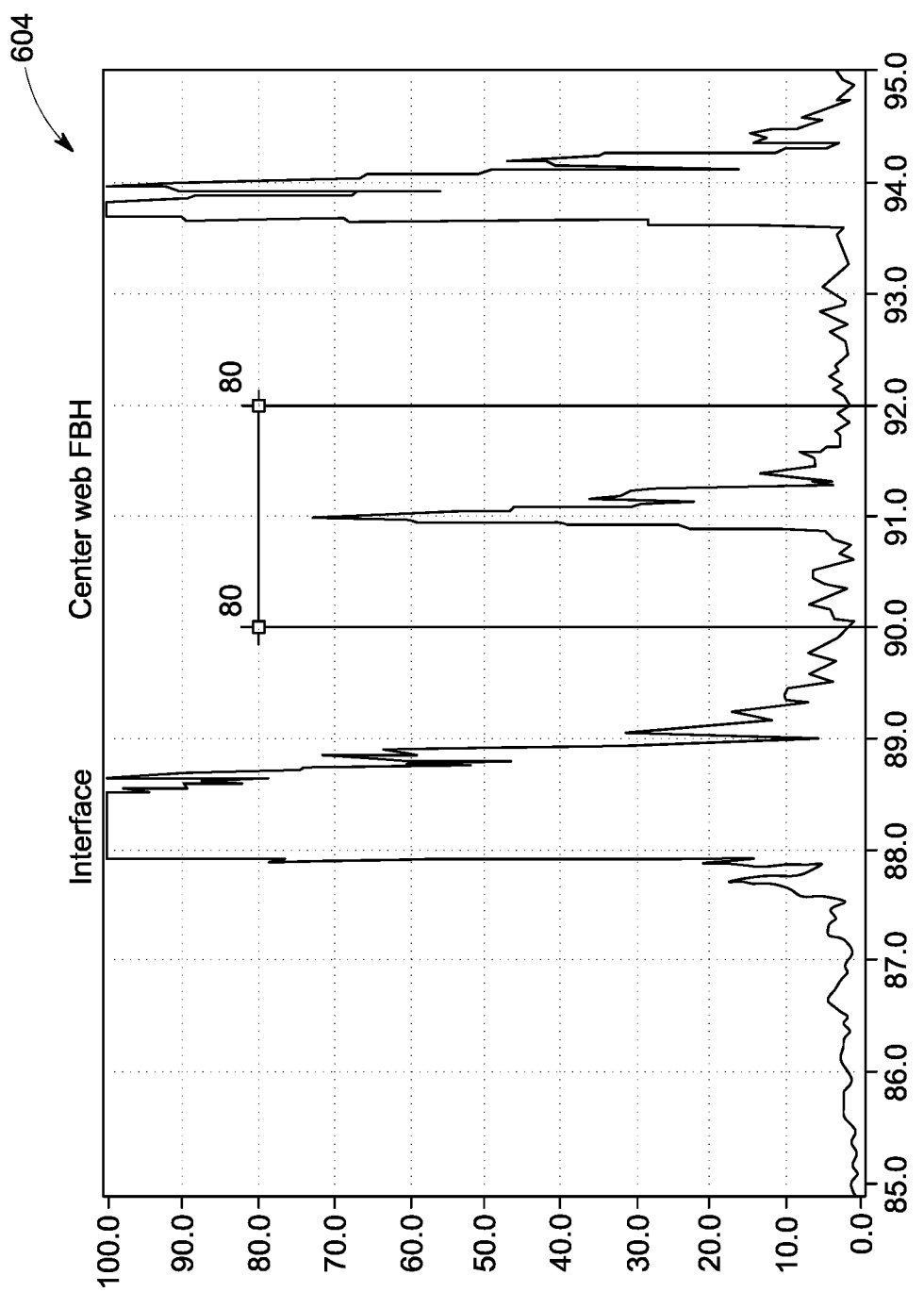
FIG. 7C is an A-Scan display of the steered ultrasonic beam detecting the center flat bottom hole of the web of the rail profile of FIG. 7A.
Figure 7D:
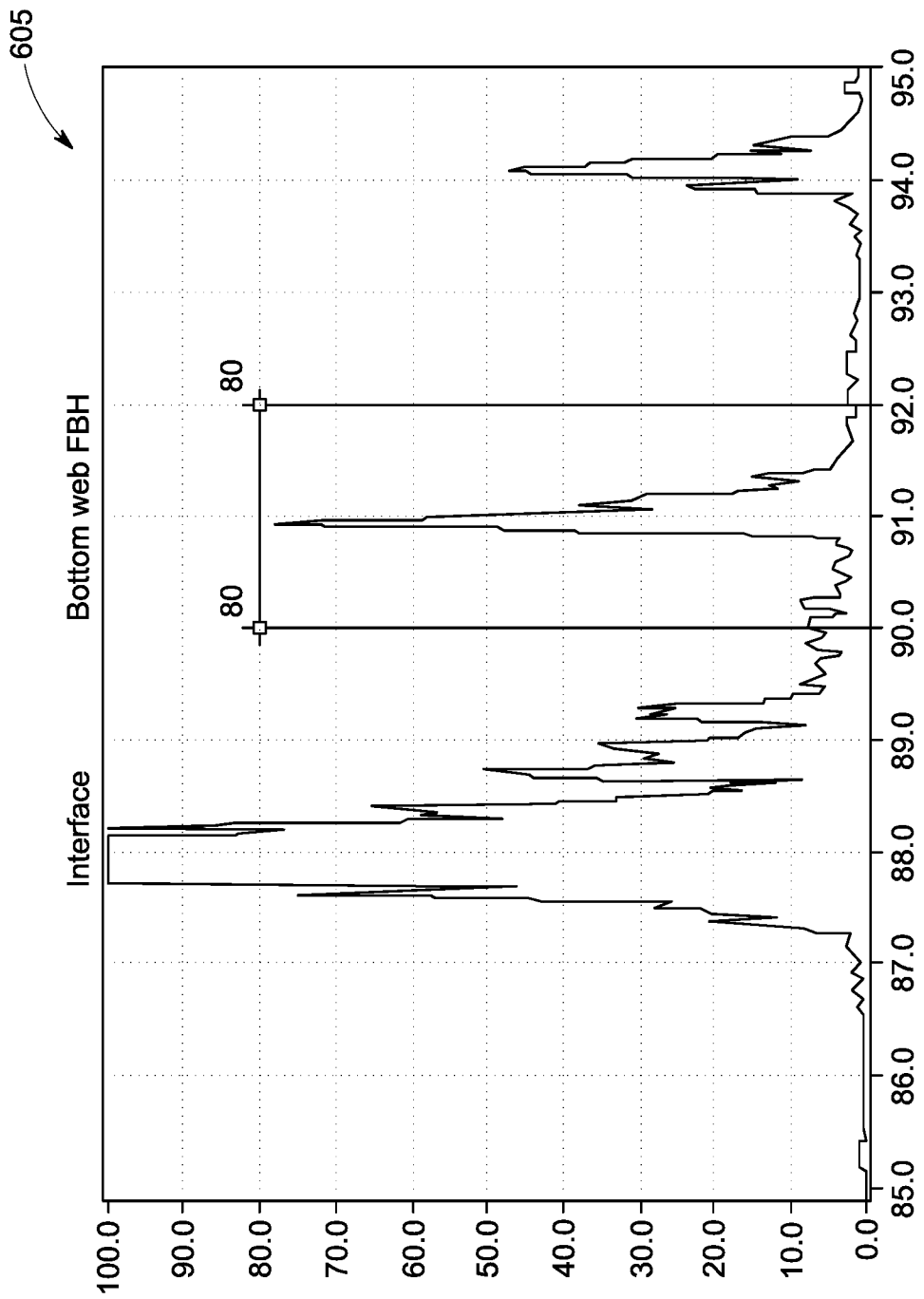
FIG. 7D is an A-Scan display of the steered ultrasonic beam detecting the bottom flat bottom hole of the web of the rail profile of FIG. 7A.

FIG. 7A is a diagram of the phased array probe 230 configured for inspection of the web 120 of the exemplary rail profile 100. Here, the defined virtual probes 233D, 233E, 233F, emit ultrasonic beams 333D, 333E, and 333F, respectively, with the delay laws optimized for detection of the individual defects, i.e. taking refraction at the web interface 403 into account, resulting in steered ultrasonic beams 333D, 333E, and 333F. FIG. 7B is the resulting A-Scan display 603 of the steered ultrasonic beam 333D detecting the top web FBH 403. FIG. 7C is the resulting A-Scan display 604 of the steered ultrasonic beam 333E detecting the center web FBH 404. FIG. 7D is the resulting A-Scan display 605 of the steered ultrasonic beam 333F detecting the bottom web FBH 405. By using optimized delay laws, the amplification gain measures at 30.5 dB for each of the FBHs 403, 404, 405. Accordingly, a size evaluation based on the reflector amplitude would correctly derive identical sizes for all three flat bottom holes 403, 404, 405 considered. The overall lower gain will also improve the signal-to-noise-ratio, increasing the overall POD during inspection.

As the exemplary measurements of FIGS. 6B-6C and 7B-7C demonstrate, the exemplary phased array system 200 is able to improve the ultrasonic echo of reflectors affected by surface conditions, which is helpful for the classification of defects based on their reflector amplitude. As before, this improvement can be achieved by changing the electronic delay and/or virtual probe arrangement, with no need for mechanical repositioning of the phased array probes.

Figure 8A:
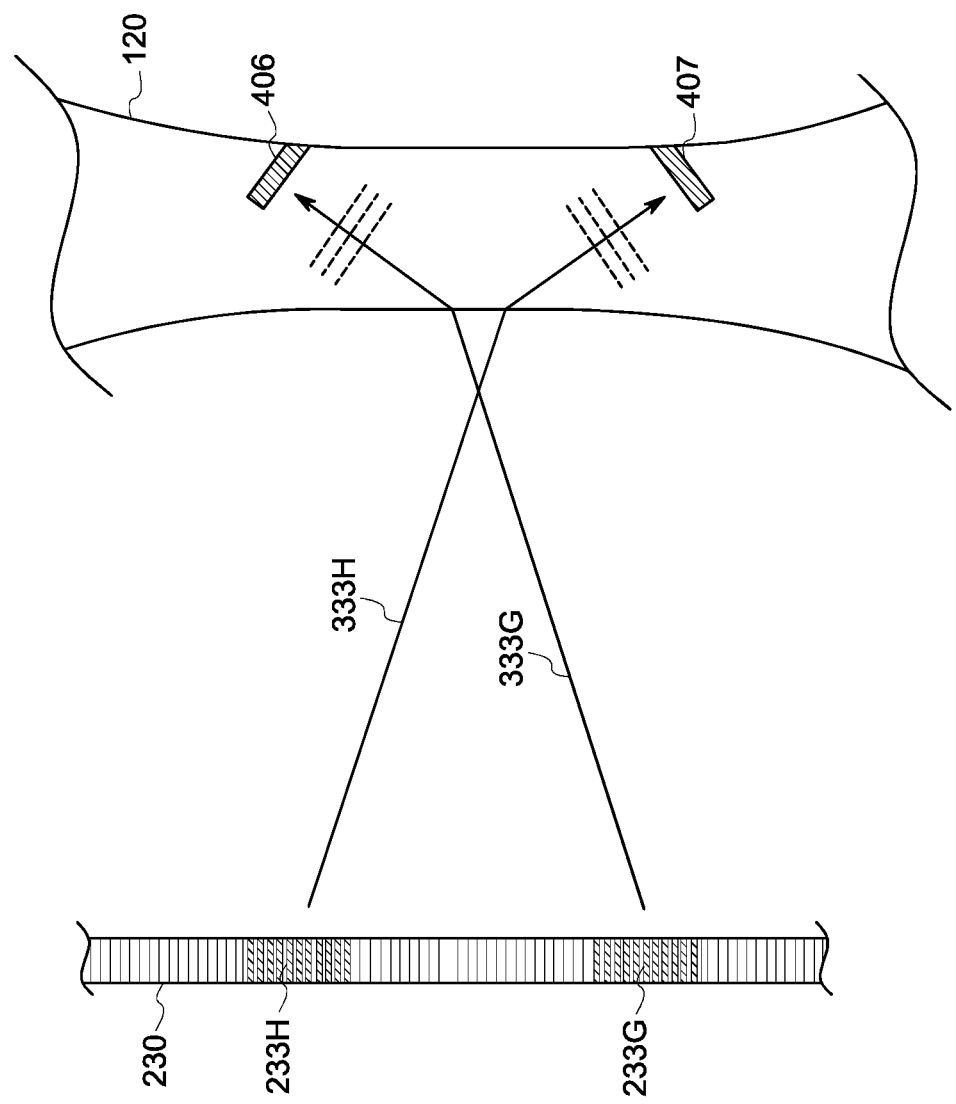
FIG. 8A is a diagram of one of the phased array probes of the exemplary ultrasonic inspection system inspecting the web section of an exemplary rail profile with a top angled side-drilled hole and a bottom angled side-drilled hole where the ultrasonic beams are steered to adapt to the location and/or orientation of the side-drilled holes.
Figure 8B:
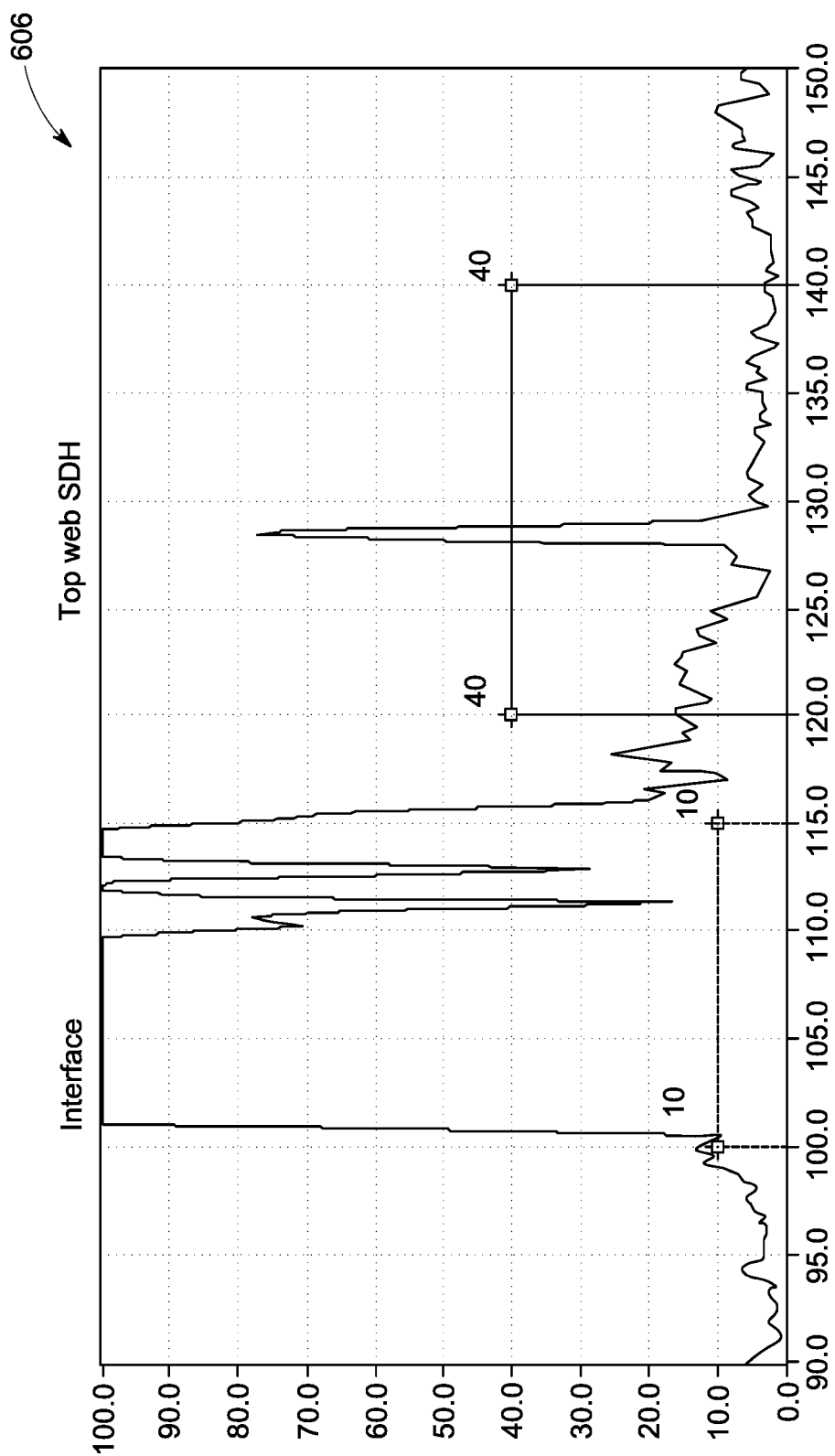
FIG. 8B is an A-Scan display of the steered ultrasonic beams detecting the top angled side-drilled hole of the web of the rail profile of FIG. 8A.
Figure 8C:
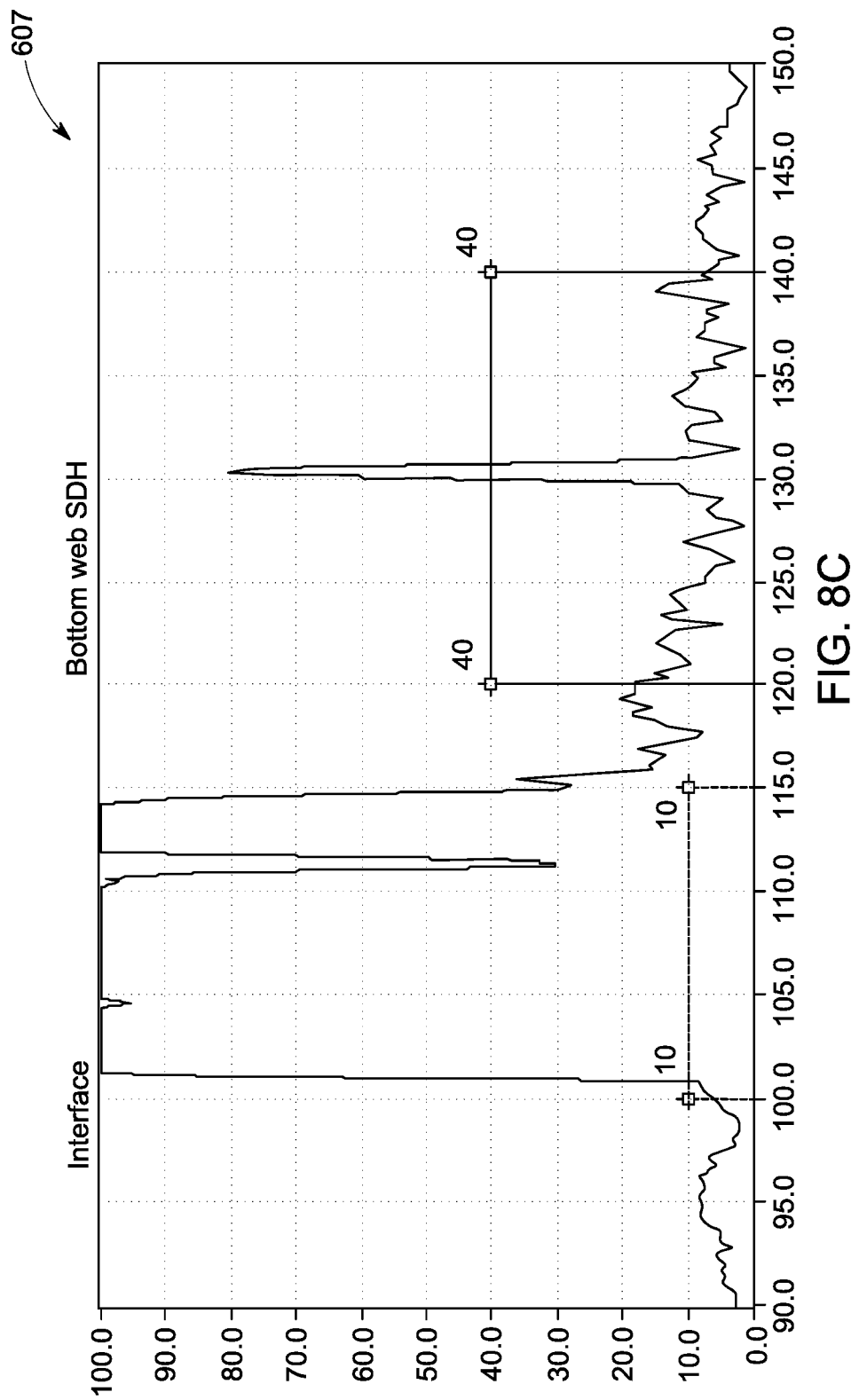
FIG. 8C is an A-Scan display of the steered ultrasonic beams detecting the bottom angled side-drilled hole of the web of the rail profile of FIG. 8A.

FIG. 8A is a diagram of the phased array probe 230 configured for inspection of the web 120 of the rail profile 100. In the illustrated embodiment, angled side-drilled holes (SDH) 406, 407, are fabricated into the web 120, resembling non-standardized defect orientations. The SDHs 406, 407 act as reflectors. For detection of the reflectors (SDHs 406, 407), multiple virtual probes 233G, 233H are defined and emit ultrasonic beams 333G and 333H, respectively, which are steered to adapt to the location and/or orientation of the side-drilled holes 406, 407. FIG. 8B is the resulting A-Scan display 606 of the steered ultrasonic beam 333G, detecting the top web SDH 406 with an amplification gain of 33 dB. FIG. 8C is the resulting A-Scan display 607 of the steered ultrasonic beam 333H detecting the bottom web SDH 407 with an amplification gain of 33.4 dB.

Figure 9A:
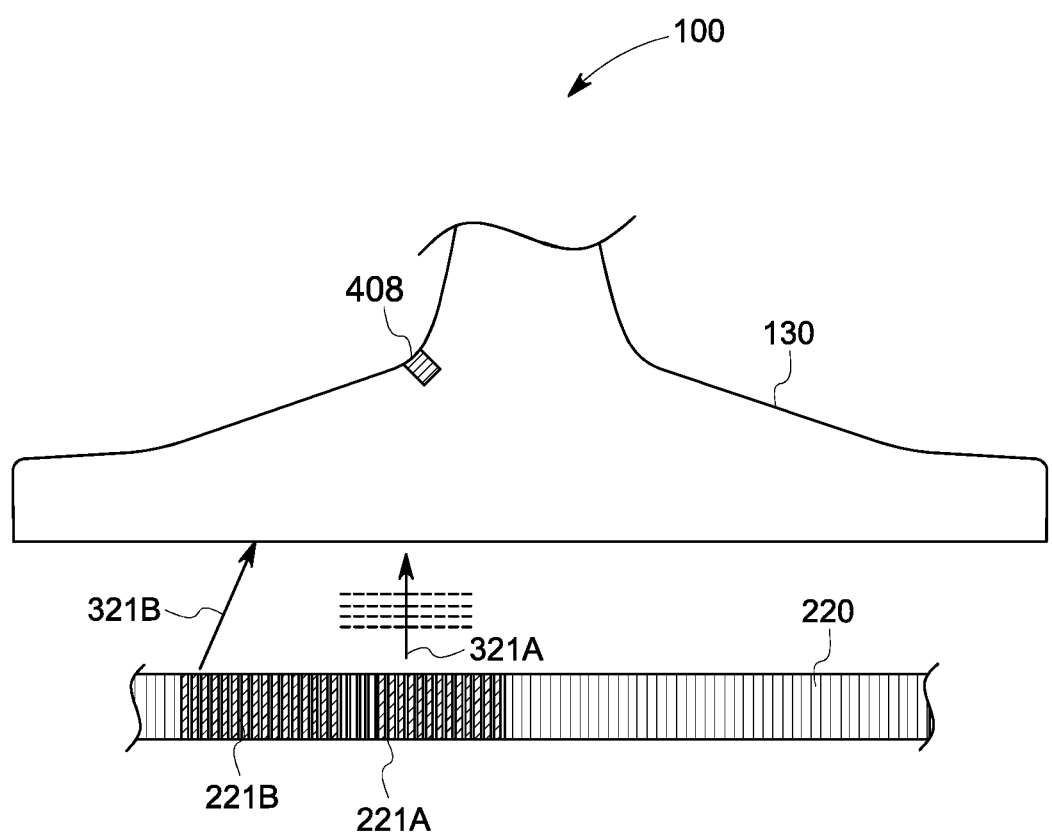
FIG. 9A is a diagram of one of the phased array probes of the exemplary ultrasonic inspection system inspecting the foot/base section of an exemplary rail profile with a notch illustrating different adaptations of the ultrasonic beam to the location and/or orientation of the notch via beam steering.
Figure 9B:
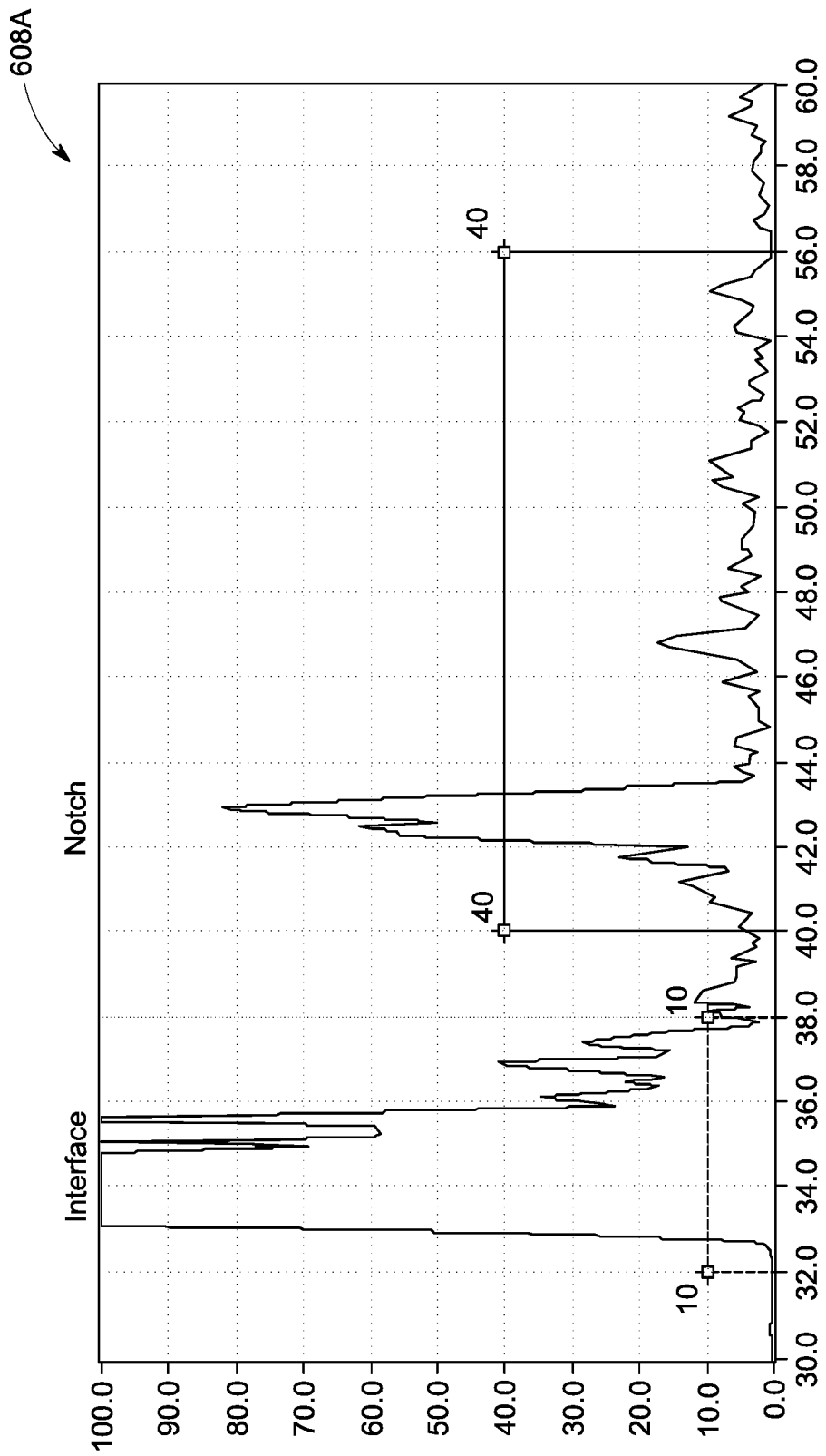
FIG. 9B is an A-Scan display of the ultrasonic beam detecting the notch of the foot/base of the rail profile of FIG. 9A at normal incidence.
Figure 9C:
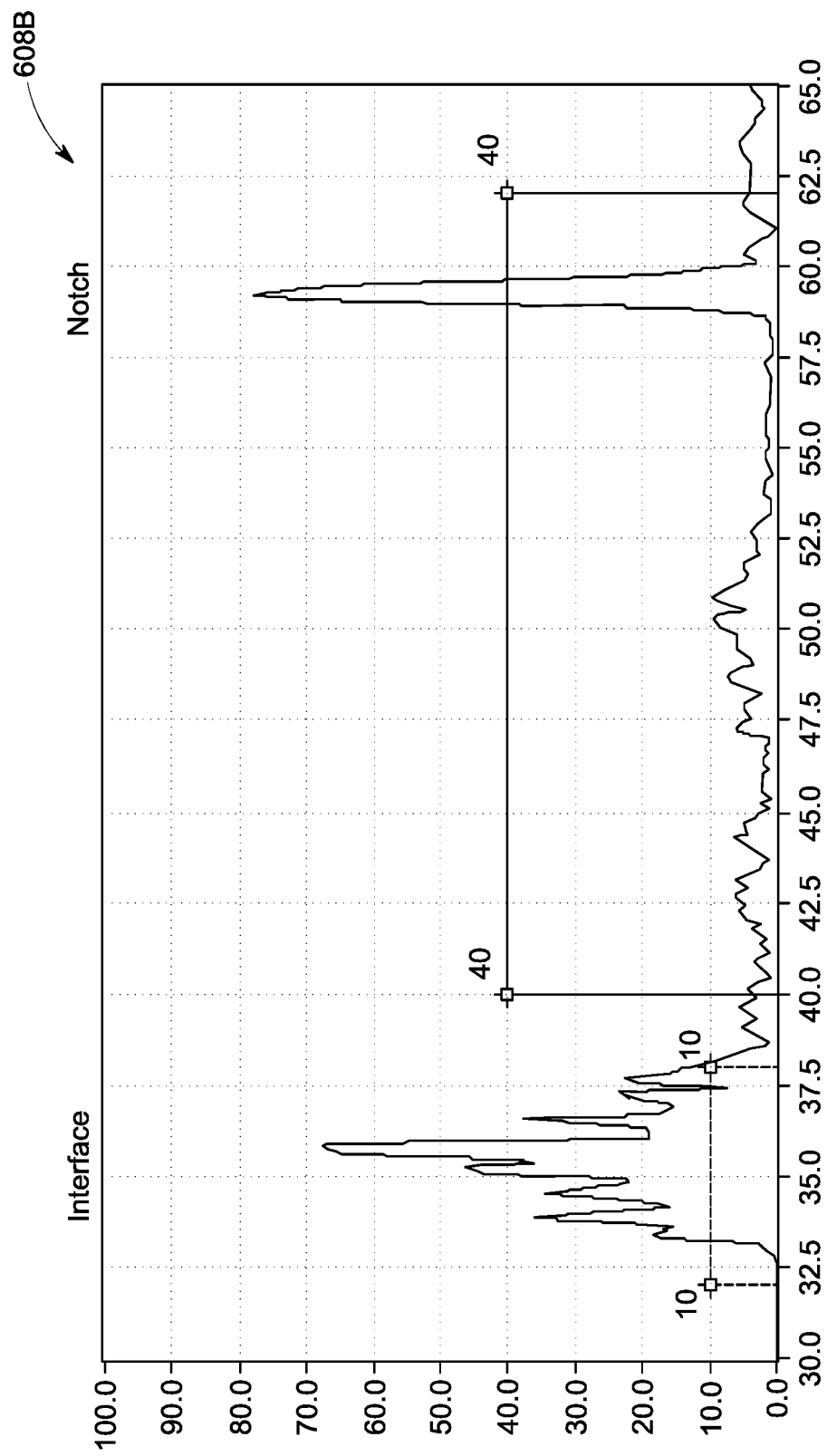
FIG. 9C is an A-Scan display of the beam detecting the notch of the foot/base of the rail profile of FIG. 9A following refraction at the interface.

FIG. 9A is a diagram of the phased array probe 220 configured for inspection of the foot/base 130 of the rail profile 100. In the illustrated embodiment, a notch 408 is fabricated into the profile 100, resembling special requirements for crack type defects and acting as a reflector. For detection of this notch 408, different approaches can be taken, as illustrated by the virtual probes 221A and 221B. emitting ultrasonic beams 321A, and 321B, respectively. The ultrasonic beams 321A, 321B employ different delay laws to adapt to the location and/or orientation of the notch 408. FIG. 9B is the resulting A-Scan display 608A of the steered ultrasonic beam 321A detecting the notch 408 with an amplification gain of 22.5 dB. FIG. 9C is the resulting A-Scan display 608B of the steered ultrasonic beam 321B detecting the notch 408 with an amplification gain of 9 dB.

As the exemplary measurements of FIGS. 8B-8C and 9B-9C demonstrate, the exemplary phased array system 200 is capable of adapting to case-specific requirements like non-standard anomaly locations and/or orientations. With the intrinsic flexibility of the phased array approach, this adaptation can be achieved by defining additional virtual probes and applying suitable electronic delay to the virtual probes, with no need for mechanical repositioning of the phased array probes.

The method and system for inspecting a rail profile using phased array technology may result in a reduction or elimination of the need to adjust the location of the ultrasonic probes when inspecting different rail profiles, improving reflector echoes, or taking special requirements for testing into account, as the ultrasonic beams transmitted by the phased array probes can be steered to adapt to the geometry of the rail profile without mechanical adjustment of the probes. This adaptability reduces the need for complex mechanical systems that are prone to failure and require maintenance. Use of phased array probes to inspect the rail profile improves upon conventional rail profile testing systems by improving (increasing) the signal-to-noise ratio by directing the ultrasonic beam toward the defect, increasing testing sensitivity, providing highest flexibility in testing the rail profile. That allows for greater testing coverage and detection of special defects beyond standard techniques, increasing the probability of detection (POD) of defects, and improving the identification of the size of defects. In addition, advanced phased array evaluation techniques (e.g., PaintBrush, acoustic holography) can be applied to further control the overall inspection.

This written description uses examples to disclose the invention, including the best mode, and also to enable a person of ordinary skill in the art to practice the invention, including making and using any devices or systems and performing any incorporated methods. The patentable scope of the invention may include other examples that occur to those of ordinary skill in the art.

What is claimed is:

1. A method comprising:
   selecting a first subset of transducer elements of a transducer array of the transducer array to emit a first ultrasonic beam toward at least a portion of a rail profile, the first subset formed from less than all of the transducer elements;
   selecting a second subset of transducer elements, different from the first subset of transducer elements, to emit a second ultrasonic beam toward the portion of the rail profile, the second subset formed from less than all of the transducer elements of the transducer array; and
   directing the first ultrasonic beam from only the first subset of the transducer elements and directing the second ultrasonic beam from only the second subset of the transducer elements for detection of a determined anomaly in the rail profile, comprising:
   emitting the first ultrasonic beam from only the first subset of the transducer elements and the second ultrasonic beam from only the second subset of the transducer elements;
   receiving a reflected signal from the rail profile; and
   analyzing the reflected signal to detect the determined anomaly in the rail profile.

2. The method of claim 1, wherein directing the first ultrasonic beam and the second ultrasonic beam comprises steering at least one of the first ultrasonic beam or the second ultrasonic beam.

3. The method of claim 2, wherein steering the at least one of the first ultrasonic beam or the second ultrasonic beam comprises applying one or more designated sets of delays to at least one of the first ultrasonic beam or the second ultrasonic beam.

4. The method of claim 1, wherein analyzing the reflected signal comprises analyzing an amplification gain measurement of the reflected signal.

5. The method of claim 4, further comprising determining characteristics of the determined anomaly based at least in part on the amplification gain measurement.

6. The method of claim 1, wherein analyzing the reflected signal comprises retrieving rail profile data relating to at least one of rail profile manufacturing information, rail profile material composition, or rail profile historical usage or age.

7. The method of claim 1, wherein the first subset of transducer elements and the second subset of transducer elements are selected based on rail geometry, and wherein selection of the first subset of transducer elements and the second subset of transducer elements comprises selecting a quantity and location of transducer elements based on the portion of the rail profile selected for analysis.

8. The method of claim 1, further comprising adapting an ultrasonic probe for inspection of a second rail profile having a different geometry from the rail profile, the ultrasonic probe comprising plural transducer elements, wherein the first subset of transducer elements and the second subset of transducer elements are included in the plural transducer elements, and wherein adapting the ultrasonic probe comprises selecting at least a third subset of the transducer elements, different from the first subset and second subset.

9. An inspection device configured to perform the method of claim 1.

10. An ultrasonic inspection system comprising:
   a plurality of ultrasonic probes comprising a first ultrasonic probe, a second ultrasonic probe, a third ultrasonic probe, and a fourth ultrasonic probe each including a transducer array of transducer elements,
   wherein the first ultrasonic probe is positioned for inspection of a rail head, the second ultrasonic probe is positioned for inspection of a rail base, and the third ultrasonic probe and fourth ultrasonic probe are each positioned for inspection of the rail head, the rail base, and a rail web that interconnects the rail head and the rail base; and
   one or more processors configured to select a first subset of transducer elements in the transducer array of at least one of the first ultrasonic probe, the second ultrasonic probe, the third ultrasonic probe, or the fourth ultrasonic probe, the first subset formed from less than all of the transducer elements, the one or more processors also configured to select a second subset of transducer elements from the transducer array that is different from the first subset of transducer elements in the at least one of the first ultrasonic probe, the second ultrasonic probe, the third ultrasonic probe, or the fourth ultrasonic probe, the second subset formed from less than all of the transducer elements of the transducer array, the one or more processors configured to direct a first ultrasonic beam to be emitted from only the first subset of the transducer elements and to direct a second ultrasonic beam to be emitted from only the second subset of the transducer elements for detection of a determined anomaly in at least one of the rail head, the rail base, or the rail web, wherein the transducer array of one or more of the first ultrasonic probe, the second ultrasonic probe, the third ultrasonic probe, or the fourth ultrasonic probe is configured to receive a reflected signal from the at least one of the rail head, the rail base, or the rail web, wherein the one or more processors are configured to analyze the reflected signal to detect the determined anomaly in the at least one of the rail head, the rail base, or the rail web.

11. The system of claim 10, wherein the one or more processors are configured to control emission of the first ultrasonic beam and the second ultrasonic beam by controlling steering of at least one of the first ultrasonic beam or the second ultrasonic beam.

12. The system of claim 11, wherein the one or more processors are configured to control steering of the at least one of the first ultrasonic beam or the second ultrasonic beam by applying one or more designated sets of delays to at least one of the first ultrasonic beam or the second ultrasonic beam.

13. The system of claim 10, wherein the one or more processors are configured to analyze the reflected signal by analyzing an amplification gain measurement of the reflected signal.

14. The system of claim 13, wherein the one or more processors are further configured to determine characteristics of the determined anomaly based at least in part on the amplification gain measurement.

15. The system of claim 10, wherein the one or more processors are configured to analyze the reflected signal by retrieving rail profile data relating to at least one of manufacturing information of the rail head, the rail base, or the rail web, material composition of the rail head, the rail base, or the rail web, or historical usage or age of the rail head, the rail base, or the rail web.

16. The system of claim 10, wherein the one or more processors are configured to select the first subset of the transducer elements and the second subset of the transducer elements based on rail geometry, and wherein the one or more processors are configured to select the first subset of the transducer elements and the second subset of the transducer elements by selecting a quantity and location of the transducer elements based on a portion of the rail head, the rail base, or the rail web that is selected for analysis.

17. The system of claim 10, wherein the one or more processors are configured to adapt the plurality of ultrasonic probes for inspection of a second rail profile that has a different geometry from a first rail profile that includes the rail head, the rail base, and the rail web, and wherein the one or more processors are configured to adapt the plurality of ultrasonic probes by selecting at least a third subset of the transducer elements of the plurality of ultrasonic probes, different from the first subset and the second subset.

18. An ultrasonic inspection system comprising:
a plurality of ultrasonic probes comprising plural transducer elements, each of the ultrasonic probes including a respective plurality of the plural transducer elements in an array, wherein the ultrasonic probes are arranged around a space that is configured to receive a rail for inspection; and
a control unit having one or more processors electrically connected to the ultrasonic probes;
wherein the one or more processors are configured to:
select a first subset of the plural transducer elements from at least one of the ultrasonic probes to emit a first ultrasonic beam toward at least a portion of the rail, when the rail is received in the space, the first subset formed from less than all of the transducer elements in the array of the at least one of the ultrasonic probes;
select a second subset of the plural transducer elements from the at least one of the ultrasonic probes, different from the first subset of the plural transducer elements, to emit a second ultrasonic beam toward the portion of the rail, the second subset formed from less than all of the transducer elements in the array of the at least one of the ultrasonic probes; and
direct the first ultrasonic beam from only the first subset of the transducer elements and direct the second ultrasonic beam from only the second subset of the transducer elements for detection of a determined anomaly in the rail, by:
the one or more processors configured to control emission of the first ultrasonic beam from only the first subset of the transducer elements and the second ultrasonic beam from only the second subset of the transducer elements, the plural transducer elements configured to receive a reflected signal from the rail responsive to the first ultrasonic beam and the second ultrasonic beam impinging upon the rail; and
the one or more processors configured to analyze the reflected signal to detect the determined anomaly in the rail.

19. The system of claim 18, wherein the plurality of ultrasonic probes comprises a first ultrasonic probe that is positioned for inspection of a rail head portion of the rail, a second ultrasonic probe that is positioned for inspection of a rail base portion of the rail, and a third ultrasonic probe and a fourth ultrasonic probe that are each positioned for inspection of the rail head, the rail base, and a rail web portion of the rail that interconnects the rail head and the rail base.

* * * * *